US009880881B1

(12) United States Patent
Perez et al.

(10) Patent No.: US 9,880,881 B1
(45) Date of Patent: Jan. 30, 2018

(54) MULTI-TIER RESOURCE AND LOAD ORCHESTRATION

(71) Applicant: HCA Holdings, Inc., Nashville, TN (US)

(72) Inventors: Gabriel O. Perez, Fort Lauderdale, FL (US); Michael A. Houston, Mentone, AL (US); Alan Scott, Franklin, TN (US); Ryan Staggs, Brentwood, TN (US); Tim Dunnington, Nashville, TN (US); Paul Currie, Franklin, TN (US)

(73) Assignee: HCA HOLDINGS, INC., Nashville, TN (US)

( * ) Notice: Subject to any disclaimer, the term of this patent is extended or adjusted under 35 U.S.C. 154(b) by 0 days.

(21) Appl. No.: 15/594,383

(22) Filed: May 12, 2017

Related U.S. Application Data

(63) Continuation-in-part of application No. 14/957,911, filed on Dec. 3, 2015.

(60) Provisional application No. 62/505,323, filed on May 12, 2017, provisional application No. 62/336,248, filed on May 13, 2016, provisional application No. 62/087,663, filed on Dec. 4, 2014.

(51) Int. Cl.
*G06F 9/50* (2006.01)
*H04L 29/08* (2006.01)
*H04L 12/911* (2013.01)

(52) U.S. Cl.
CPC ............ *G06F 9/505* (2013.01); *G06F 9/5083* (2013.01); *H04L 29/08144* (2013.01); *H04L 29/08225* (2013.01); *H04L 47/781* (2013.01); *H04L 67/1097* (2013.01); *H04L 67/327* (2013.01)

(58) Field of Classification Search
CPC ...................................................... G06F 9/505
See application file for complete search history.

(56) References Cited

U.S. PATENT DOCUMENTS

| | | | |
|---|---|---|---|
| 7,174,381 B2* | 2/2007 | Gulko | G06F 8/451 709/226 |
| 7,707,289 B1* | 4/2010 | Skene | H04L 29/06 709/217 |
| 2003/0229645 A1* | 12/2003 | Mogi | G06F 3/0605 |
| 2006/0112247 A1* | 5/2006 | Ramany | G06F 3/0605 711/165 |
| 2016/0277255 A1* | 9/2016 | Dasgupta | G06F 9/505 |

* cited by examiner

*Primary Examiner* — Charlie Sun
(74) *Attorney, Agent, or Firm* — Kilpatrick Townsend & Stockton LLP

(57) ABSTRACT

Systems, methods, and machine-readable media for process-performing resources and process specifications particularized to loads are provided. A provisional electronic composite for a load may be created. A type of process-performing resource may be identified. Performance data may be accessed to identify a process-performance duration that corresponds to a process type, the type of process-performing resource, process-performance locations, and process-performance times. A process-assignment duration may be defined, and an availability of a process-performing resource may be detected. A performance time may be determined based on the availability of the process-performing resource. Instruction to perform the process at the performance time may transmitted to at least one resource-controlling device. The provisional electronic composite for the load may be modified based on the performance time and the instruction to form an updated electronic composite.

20 Claims, 15 Drawing Sheets

MULTI-TIER RESOURCE AND LOAD ORCHESTRATION

CROSS-REFERENCES TO RELATED APPLICATIONS

This application claims the benefit of and priority to U.S. Provisional Application No. 62/505,323, filed on May 12, 2017, and U.S. Provisional Application No. 62/336,248, filed May 13, 2016. This application is also a continuation-in-part of U.S. patent application Ser. No. 14/957,911, filed Dec. 3, 2015, which claims the benefit of and priority to U.S. Provisional Application No. 62/087,663, filed Dec. 4, 2014. The entire disclosures of the above applications are hereby incorporated by reference, for all purposes, as if fully set forth herein.

BACKGROUND

Certain embodiments of the present disclosure relate generally to load handling and in particular to systems and methods orchestrate process-performing resources and process specifications particularized to individual loads.

Performance of various processes frequently requires use of specialized resources. Quantities and capacities of resources may be limited, however, which may limit an extent to which resources may be available for a process at a requested time. Such limitations may result in an iterative communication exchange between a requesting device and resource devices to identify a responsive resource device associated with a resource load and configuration enabling handling of a process.

Therefore, there is a need in the art for technological improvements that address such limitations and technical challenges. Generating efficient resource-assignment can promote overall resource access and process performance. These and others needs are addressed by the present disclosure.

BRIEF SUMMARY

Certain embodiments of the present disclosure relate generally to load handling and in particular to systems and methods orchestrate process-performing resources and process specifications particularized to individual loads.

In one aspect, a system may correspond to a number of technological improvements provided to orchestrate process-performing resources and process specifications particularized to individual loads. The system may include one or more interfaces that receive a first set of electronic communications from one or more client devices. The first set of electronic communications may include a digital identifier of an individual load. The system may include one or more interfaces that receive a second set of electronic communications from one or more location data sources. The second set of electronic communications may include location data indicative of a first location of the individual load. The system may include one or more interfaces that transmit a third set of electronic communications to one or more resource-controlling devices. The third set of electronic communications may include an instruction to perform a process. The system may include one or more interfaces that transmit a fourth set of electronic communications to the one or more client devices. The fourth set of electronic communications may include specifications of electronic composites. The system may include an aggregator to retrieve, from one or more electronic records and based at least in part on the digital identifier of the individual load, a first set of secured information associated with the individual load. The first set of secured information associated with the individual load may include one or more attributes corresponding to one or more of an indication of a set of one or more conditions of the individual load, an indication of a set of one or more services associated with the individual load, and/or an indication of a set of one or more auxiliary resources associated with the individual load. The system may include one or more load-balancing processors that create a provisional electronic composite for the individual load at least in part by one or a combination of the following. The process may be identified based at least in part on the first set of electronic communications. One or more process-performance locations may be identified based at least in part on the first set of electronic communications. One or more process-performance times may be identified based at least in part on the first set of electronic communications. A process type of the process may be identified. Based at least in part on the process type, a type of process-performing resource may be identified to service loads having one or more characteristics corresponding to the one or more attributes. Performance data, from a performance data store, may be accessed to identify, based at least in part on the performance data, a process-performance duration that corresponds to one or more of the process type, the type of process-performing resource, the one or more process-performance locations, and/or one or more process-performance times. A process-assignment duration may be defined based at least in part on the process-performance duration. An availability of a process-performing resource of the type of process-performing resource that is of a duration that is at least as long as the process-assignment duration may be detected. A performance time for the process to be performed may be determined based at least in part on the availability of the process-performing resource. Transmission, to at least one resource-controlling device of the one or more resource-controlling devices, of the instruction to perform the process at the performance time may be caused. The provisional electronic composite for the individual load may be modified based at least in part on the performance time and the instruction to the at least one resource-controlling device, the modifying forming an updated electronic composite. Transmission, to at least one of the one or more client devices, of content indicating at least a portion of the updated electronic composite may be caused.

In another aspect, a method may correspond to a number of technological improvements provided to orchestrate process-performing resources and process specifications particularized to individual loads. The method may include one or a combination of the following. A first set of electronic communications from one or more client devices may be received. The first set of electronic communications may include a digital identifier of an individual load. A second set of electronic communications from one or more location data sources received. The second set of electronic communications may include location data indicative of a first location of the individual load. A third set of electronic communications to one or more resource-controlling devices may be transmitted. The third set of electronic communications may include an instruction to perform a process. A fourth set of electronic communications to the one or more client devices may be transmitted. The fourth set of electronic communications may include specifications of electronic composites. A first set of secured information associated with the individual load may be retrieved from one or more electronic records and based at least in part on the digital identifier of the individual load. The first set of secured information associated with the individual load may include one or more attributes corresponding to one or more of an indication of a set of one or more conditions of the individual load, an indication of a set of one or more services associated with the individual load, and/or an indication of a set of one or more auxiliary resources associated with the individual load. A provisional electronic composite for the individual load may be created at least in part by one or a combination of the following. The process may be identified based at least in part on the first set of electronic communications. One or more process-performance locations may be identified based at least in part on the first set of electronic communications. One or more process-performance times may be identified based at least in part on the first set of electronic communications. A process type of the process may be identified. Based at least in part on the process type, a type of process-performing resource may be identified to service loads having one or more characteristics corresponding to the one or more attributes. Performance data, from a performance data store, may be accessed to identify, based at least in part on the performance data, a process-performance duration that corresponds to one or more of the process type, the type of process-performing resource, the one or more process-performance locations, and/or one or more process-performance times. A process-assignment duration may be defined based at least in part on the process-performance duration. An availability of a process-performing resource of the type of process-performing resource that is of a duration that is at least as long as the process-assignment duration may be detected. A performance time for the process to be performed may be determined based at least in part on the availability of the process-performing resource. Transmission, to at least one resource-controlling device of the one or more resource-controlling devices, of the instruction to perform the process at the performance time may be caused. The provisional electronic composite for the individual load may be modified based at least in part on the performance time and the instruction to the at least one resource-controlling device, the modifying forming an updated electronic composite. Transmission, to at least one of the one or more client devices, of content indicating at least a portion of the updated electronic composite may be caused.

In yet another aspect, one or more non-transitory, machine-readable media having machine-readable instructions thereon are provided which, when executed by a system to provide a number of technological improvements to orchestrate process-performing resources and process specifications particularized to individual loads, implements a method. The method may include one or a combination of the following. A first set of electronic communications from one or more client devices may be received. The first set of electronic communications may include a digital identifier of an individual load. A second set of electronic communications from one or more location data sources received. The second set of electronic communications may include location data indicative of a first location of the individual load. A third set of electronic communications to one or more resource-controlling devices may be transmitted. The third set of electronic communications may include an instruction to perform a process. A fourth set of electronic communications to the one or more client devices may be transmitted. The fourth set of electronic communications may include specifications of electronic composites. A first set of secured information associated with the individual load may be retrieved from one or more electronic records and based at least in part on the digital identifier of the individual load. The first set of secured information associated with the individual load may include one or more attributes corresponding to one or more of an indication of a set of one or more conditions of the individual load, an indication of a set of one or more services associated with the individual load, and/or an indication of a set of one or more auxiliary resources associated with the individual load. A provisional electronic composite for the individual load may be created at least in part by one or a combination of the following. The process may be identified based at least in part on the first set of electronic communications. One or more process-performance locations may be identified based at least in part on the first set of electronic communications. One or more process-performance times may be identified based at least in part on the first set of electronic communications. A process type of the process may be identified. Based at least in part on the process type, a type of process-performing resource may be identified to service loads having one or more characteristics corresponding to the one or more attributes. Performance data, from a performance data store, may be accessed to identify, based at least in part on the performance data, a process-performance duration that corresponds to one or more of the process type, the type of process-performing resource, the one or more process-performance locations, and/or one or more process-performance times. A process-assignment duration may be defined based at least in part on the process-performance duration. An availability of a process-performing resource of the type of process-performing resource that is of a duration that is at least as long as the process-assignment duration may be detected. A performance time for the process to be performed may be determined based at least in part on the availability of the process-performing resource. Transmission, to at least one resource-controlling device of the one or more resource-controlling devices, of the instruction to perform the process at the performance time may be caused. The provisional electronic composite for the individual load may be modified based at least in part on the performance time and the instruction to the at least one resource-controlling device, the modifying forming an updated electronic composite. Transmission, to at least one of the one or more client devices, of content indicating at least a portion of the updated electronic composite may be caused.

In various embodiments, the first set of electronic communications may further include an electronic request to perform the process with respect to the individual load and/or a specification of the type of process-performing resource. In various embodiments, the first set of electronic communications may further include one or more of an indication of a location, an indication of a procedure, and/or an indication of a condition. A request to perform the process with respect to the individual load based at least in part on the first set of electronic communications may be inferred. The creating the provisional electronic composite, the forming the updated electronic composite, and the causing transmission of the content may be performed prior to receiving an explicit request to perform the process with respect to the individual load. In various embodiments, the identifying the process and the identifying the one or more process-performance locations may be further based at least in part on a first location of the individual load and a second location based at least in part on the request inferred.

In various embodiments, a temporal input received via at least one of the one or more interfaces may be processed, the temporal input indicative of one or more times and/or one or more time windows. A timetable data store may be accessed to evaluate resource timetables that indicate capacities to accept processes during particular time periods. The process-performing resource may be selected from a set of process-performing resources at least in part by matching the temporal input to at least one of the capacities.

In various embodiments, location-based data, received from one or more location data sources, that indicates a current location of the process-performing resource may be processed. A timeliness of performance of the process may be predicted based at least in part on the location-based data. A target efficiency metric reflecting a target efficiency of process performance may be accessed. A second process may be identified in a flexible process schedule. A second performance time for the second process to be performed may be determined based at least in part on the timeliness of performance of the process predicted and the target efficiency metric. Transmission of a second instruction to perform the second process at the second performance time may be caused.

In various embodiments, the location-based data may be derived at least partially from one or more of an electronic tag sensor, at least one of the one or more client devices, a resource-allocation system, and/or a monitoring device. In various embodiments, the updated electronic composite for the individual load may be modified based at least in part on the second process and the second performance time. Transmission, to the at least one of the one or more client devices, of second content indicating at least the second process and the second performance time may be caused.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure may be described in conjunction with the following appended figures.

In the appended figures, similar components and/or features may have the same reference label. Further, various components of the same type may be distinguished by following the reference label by a dash and a second label that distinguishes among the similar components. If only the first reference label may be used in the specification, the description may be applicable to any one of the similar components having the same first reference label irrespective of the second reference label.

DETAILED DESCRIPTION

The ensuing description provides preferred exemplary embodiment(s) only, and may be not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Various embodiments will now be discussed in greater detail with reference to the accompanying figures, beginning with FIG. 1.

Figure 1:
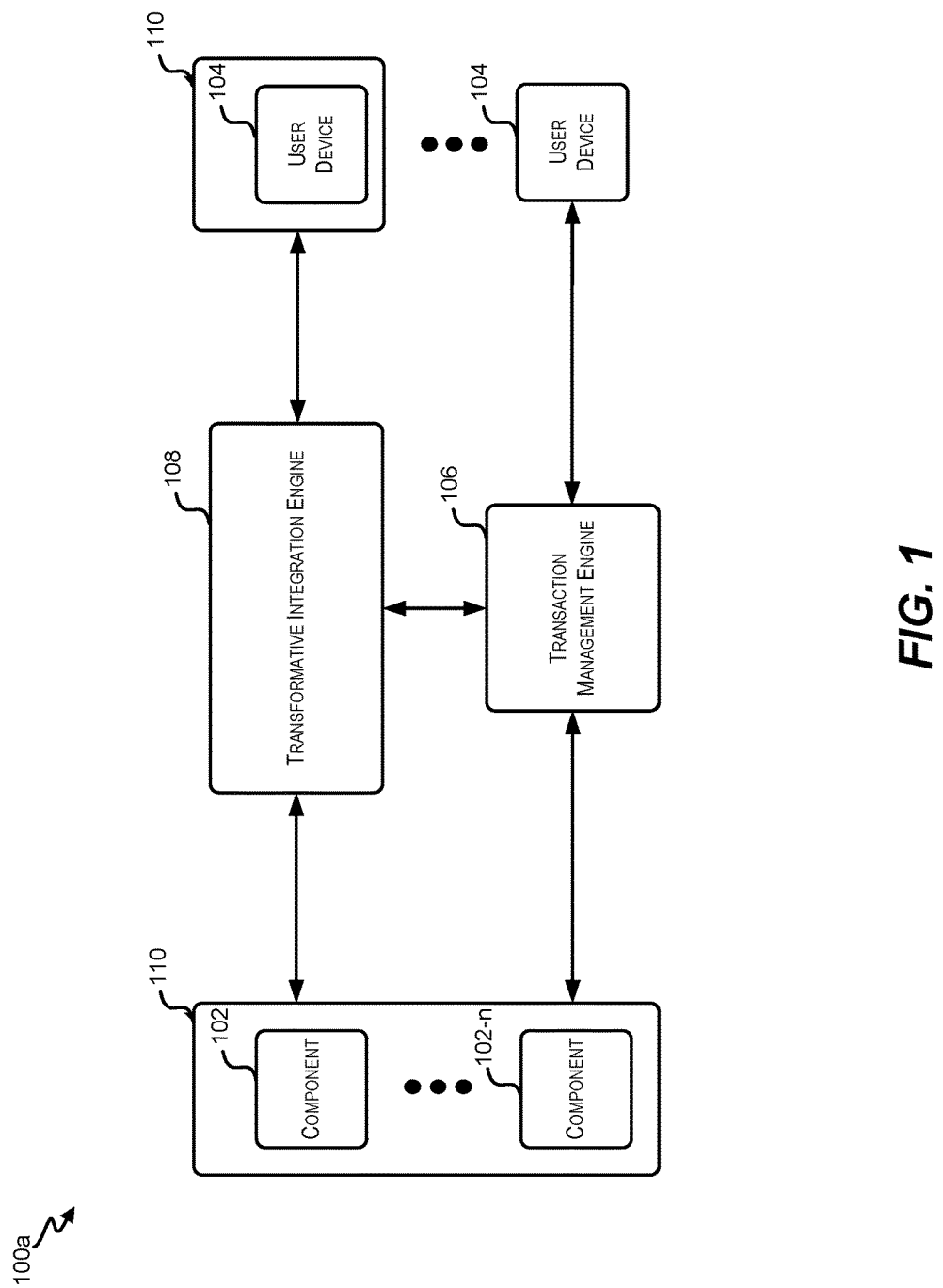
FIG. 1 illustrates a block diagram of an interaction system, in accordance with certain embodiments of the present disclosure.

Referring first to FIG. 1, a block diagram of an embodiment of an interaction system 100*a* is illustrated. Generally, in interaction system 100*a*, data can be generated at one or more system components 102 and/or devices 104. Communication control engine 106 can control the flow of communications within interaction system. Transformative processing engine 108 can receive, intercept, track, integrate, process and/or store such data.

Data flowing in interaction system 100*a* can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include secured information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected input received at a user interface of component 102 and/or data in a corresponding communication received from a user device.

As another example, a device 104 can be configured to detect input received at a user interface of the device. The input can include, for example, an identifier of an object or entity, an instruction, a characterization of an object or entity, an identification of an analysis to be performed, a specification of an aggregation or data processing to be performed, and/or an identification of a destination for a data-analysis report. User device 104 can further be configured to detect input requesting particular data, to generate a request communication (e.g., to be sent to transformative processing engine), to receive the requested data and/or to present the received data.

The depicted engines, devices and/or components can communicate over one or more networks. A network of one or more networks can include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more devices 104 are illustrated as communicating via transformative processing engine 108 and/or control engine 106, this specification is not so limited. For example, each of one or more components 102 may communicate with each of one or more devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or input. A user device 104 can include a device configured to receive data from a user and/or present data to a user. It will be appreciated that, in some instances, a component 102 is also a user device 104 and vice-versa. For example, a single device can be configured to detect sensor measurements, receive input and present output.

A component 102 can be configured to generate a communication that is in one or more formats, some of which can be proprietary. For example, an imaging machine (e.g., one of one or more components 102) manufactured by company A, located within a first premises (e.g., premises 110), and belonging to a first client, may save and transfer data in a first format. An imaging machine (e.g., one of one or more components 102) manufactured by company B, located within the first premises (e.g., premises 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first premises belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a premises 110 (e.g., client premises). Each premises 110 may correspond to a single location and/or processing focus. Exemplary types of premises include server farm premises, webserver premises, data-storage premises, technical-support premises, telecommunication premises, care premises and/or operation premises. For example, a first premises may include a structure at a first location at which one or more resources (e.g., computational resources, equipment resources, laboratory resources and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first premises may be better configured for handling a particular type of service requests compared to those in another premises. As another examples, different premises may include resources of similar or same types but may vary in terms of, for example, user accessibility, location, managing client, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more devices 104 are associated with premises 110. In some examples, at least some of one or more devices 104 need not be associated with premises 110 or any other premises. Similar to one or more components 102, one or more devices 104 may be capable of receiving, generating, processing and/or transmitting data. Examples of one or more devices 104 include, for example, a computer, a mobile device, a smart phone, a laptop, an electronic badge, a set-top box, a thin client device, a tablet, a pager, and other similar user devices). One or more devices 104 may be configured to run one or more applications developed for interacting with data collected by transformative processing engine 108. For example, those user devices of one or more devices 104 that are not associated with premises 110 may be configured to run one or more third-party applications that may rely in part on the data gathered by transformative processing engine 108.

Each of one or more components 102 and one or more devices 104 may be utilized by one or more users (not shown). Each of the one or more users may be associated with one or more clients. For example, one of the one or more users can be associated with a client as a result of being employed by the client, physically located at a location of the client, being an agent of the client or receiving a service from the client.

In some examples, one or more components 102 and one or more devices 104 may communicate with transformative processing engine 108 and control engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more devices 104, in their native formats and transform them into any of one or more formats. The received and/or transformed communications can be transmitted to one or more other devices (e.g., control engine 106, an entity device and/or a user device) and/or locally or remotely stored. In some examples, transformative processing engine 108 receives data in a particular format (e.g., the HL7 format) or conforming to any other suitable format and/or is configured to transform received data to conform with the particular format.

One or more components 102 of premises 110 can include and/or has access to a local or remote memory for storing generated data. In some examples, the data is stored by one or more servers local to premises 110. Such storage may enable premises 110 to retain locally data pertaining to its premises prior to (or in conjunction with) the data being shared with transformative processing engine 108 and/or control engine 106. In some examples, the one or more servers of premises 110 share data directly with a record service (not shown), and the record service makes the data available to transformative processing engine 108 and/or control engine 106. Once an electronic record is updated at premises 110, an indication of the update may be provide to the record service. The record service may then update a corresponding record associated with the electronic record.

The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from an component (or premises), the record service can identify a corresponding record and update the record to include the data (or processed version thereof). In some examples, the record service provides data to transformative processing engine 108.

Premises 110 can include one at which a resource is located and/or service is provided. Irrespective of the type of premises, premises 110 may update data, maintain data, and communicate data to transformative processing engine 108. At least some of the data may be stored local to premises 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more devices 104 may operate according to a private and/or proprietary network or protocols. In other examples, one or more devices 104 may operate on public networks. In any case, however, transformative processing engine 108 can have access to the one or more components and can communicate with them via a public, private and/or proprietary network or protocols. The use of one or more private and/or proprietary protocols can promote secure transfer of data.

Figure 2:
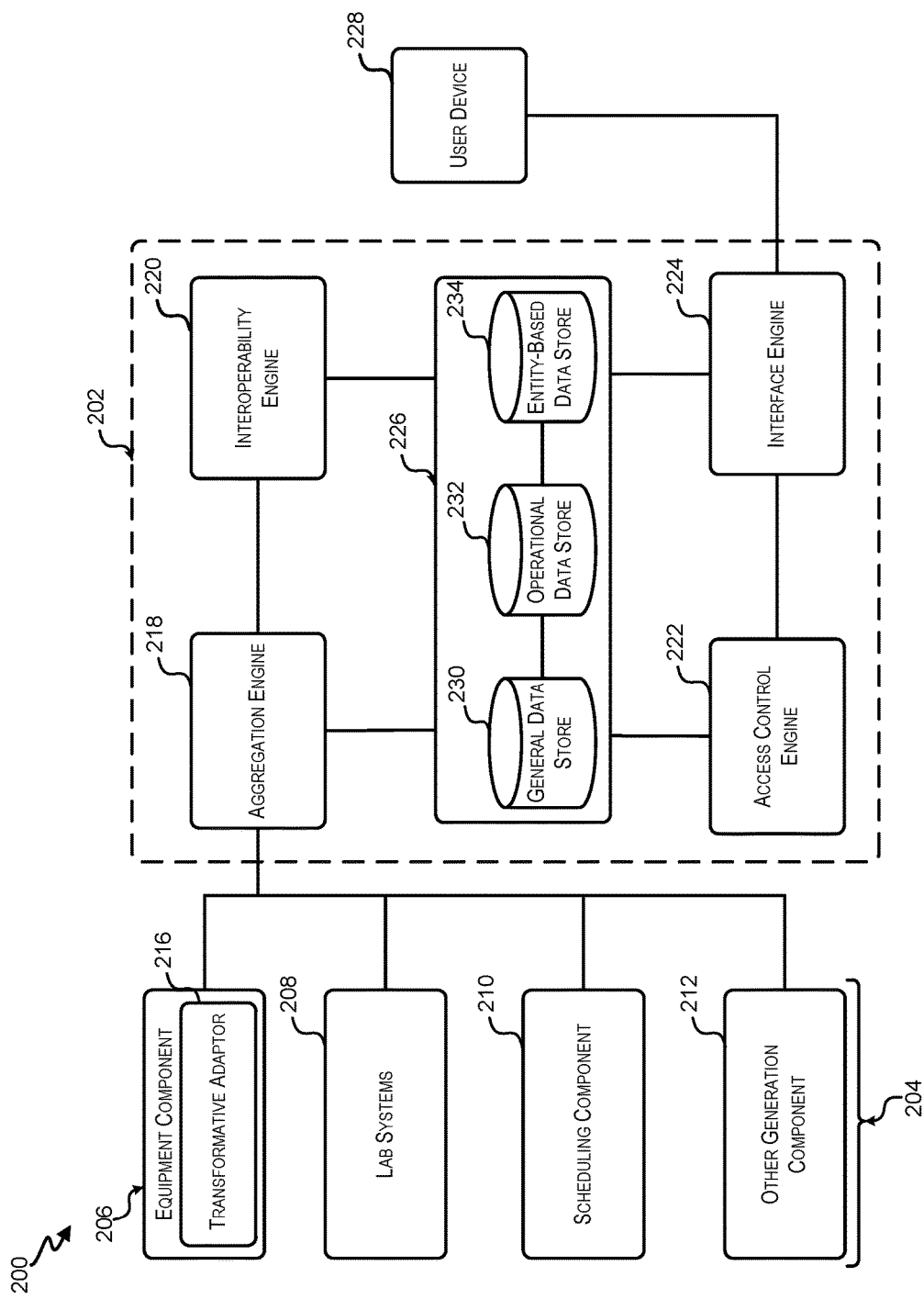
FIG. 2 illustrates a block diagram of an interaction system, in accordance with certain embodiments of the present disclosure.

Referring next to FIG. 2, a block diagram of an example of an interaction system 200 is shown. Interaction system 200 includes a transformative integration engine 202. Transformative integration engine 202 is an example of transformative processing engine 108 discussed with reference to FIG. 1. Interaction system 200 also includes one or more generation components 204. In particular, one or more generation components 204 includes an equipment component 206, a lab systems component 208, a scheduling component 210 and other generation component 212. One or more generation components 204 are examples of one or more components 102 discussed with reference to FIG. 1.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative integration engine 202 in accordance with techniques described herein may achieve this design—making large amounts of data, in many different originating formats available to various types of users, via one or more interfaces.

While one or more generation components 204 are illustrated adjacent to each other, it is understood that each may be located within one premises or that the components may be spread out among many premises. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative integration engine 202 may perform similar processes as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative integration engine 202.

Scheduling component 210 includes any suitable computing devices used for operations-related purposes with respect to interaction system 200. For example, scheduling component 210 can be configured to schedule a resource for allocation for a particular entity during a particular time slot. Scheduling component 210 can monitor a schedule for the resource and can identify one or more available time slots that may be secured by a particular entity. Upon receiving a scheduling indication, scheduling component 210 may update a schedule of a resource to reflect that a particular time slot is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative integration engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative integration engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative integration engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

Transformative integration engine 202 includes an aggregation engine 218, an interoperability engine 220, an access control engine 222, an interface engine 224, and a data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of premises, characteristic of premises, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, operational and analytics information, output data from one or more generation components 204, and the like may be retained. The data within the data stores 230, 232, and 234 include elements or tags such that a particular data (e.g., for a single entity, protocol, etc.) can be retrieved.

Access control engine 222 is configured to control access to features of transformative integration engine 202, including access to the data retained in data store 226. For example, access control engine 222 may verify that a user device such as user device 228 is authorized to access data store 226. To verify the user device 228, access control engine 222 may require that a user of the user device 228 input a username and password, have a profile associated with the interaction system, have paid a subscription fee associated with access to data store 226, and the like. Access control engine 222 may also verify that the user device 228 has an IP address or geographical location that corresponds to an authorized list, that the user device 228 includes a plug-in for properly accessing data store 226, that the user device 228 is running certain applications required to access data store 226, and the like.

Interface engine 224 is configured to retrieve the data from data store 226 and provide one or more interfaces for interacting with elements of transformative integration engine 202. For example, interface engine 224 includes an interface by which an application running on user device 228 can access portions of data within data store 226.

Figure 3:
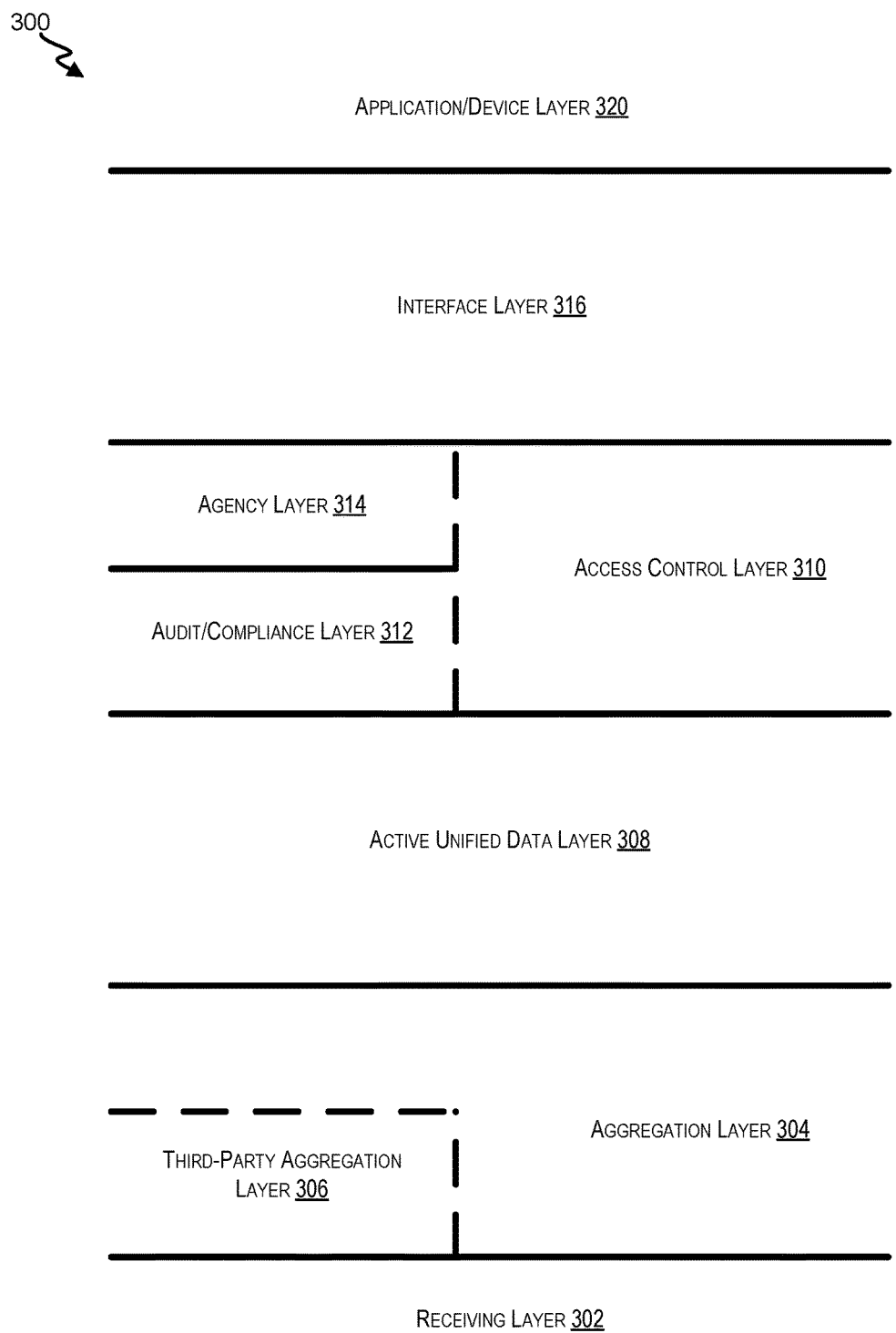
FIG. 3 illustrates a block diagram of an architecture stack, in accordance with certain embodiments of the present disclosure.

Turning next to FIG. 3, an architecture stack 300 is shown. In some examples, techniques relating to control of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different entities and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a premises, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access control layer 310, which can include an audit/compliance layer 312 and/or an agency layer 314. Access control layer 310 includes elements to control access to the data. For example, access control layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access control layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access control layer 310 and the data within active unified data layer 308. Audit/compliance layer 312 and agency layer 314 are sub-layers of access control layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system and may use applications (not shown) to access the elements within architecture stack 300 via one or more interfaces (e.g., to access data stored within active unified data layer 308). Such applications may have been developed by the interaction system or by third-parties Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
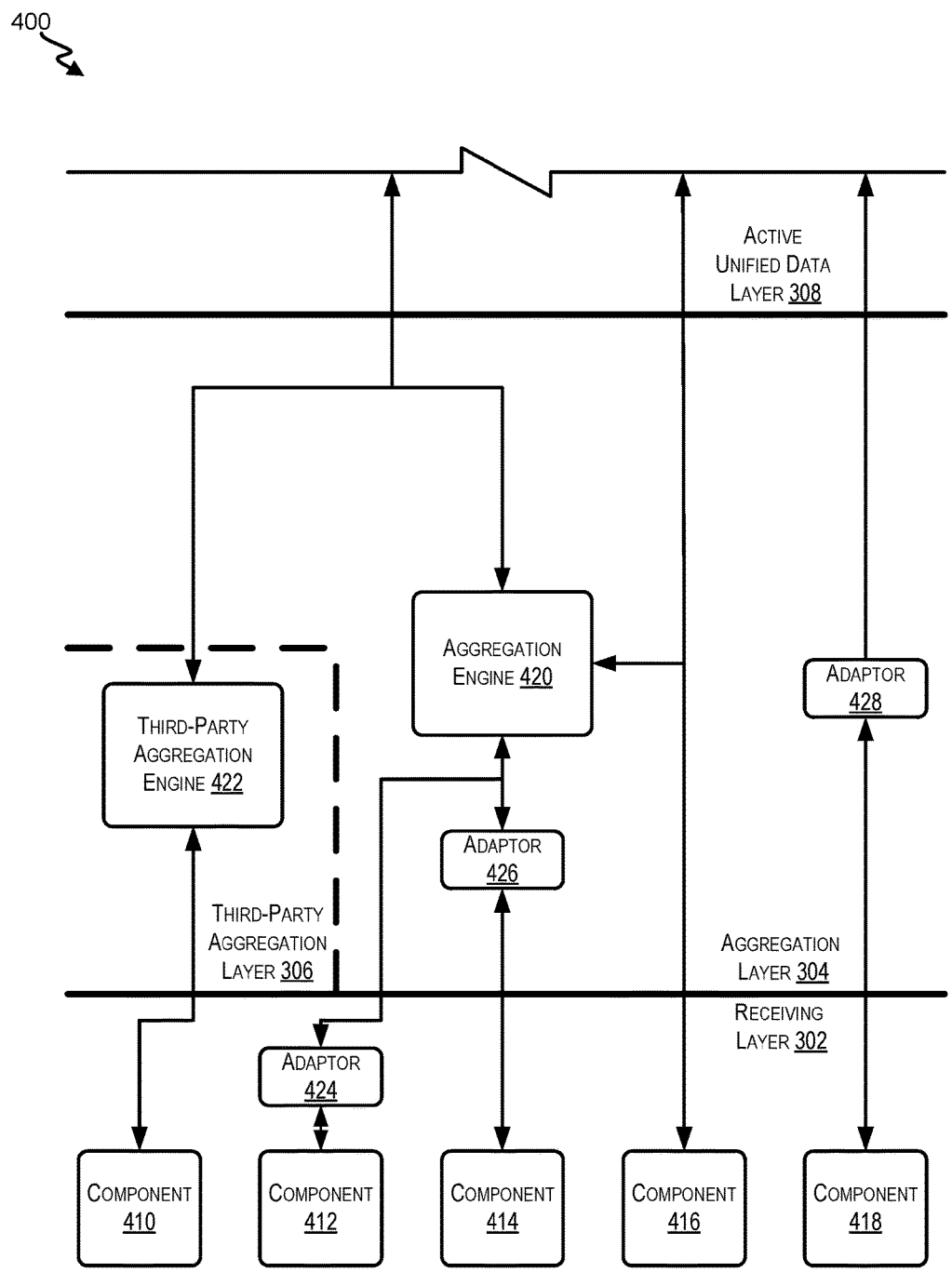
FIG. 4 illustrates a block diagram of a portion of the architecture stack, in accordance with certain embodiments of the present disclosure.

Turning next to FIG. 4, a diagram 400 is shown that depicts a portion of architecture stack 300 according to an embodiment of the invention. In particular, the diagram 400 includes receiving layer 302, aggregation layer 304, aggregation layer 306, and a portion of active unified data layer 308. Receiving layer 302 receives data from one or more components 410-418.

Components 410-418 are examples of one or more generation components 204. Components 410-418 may be spread across multiple premises. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or an aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to aggregation engine 422.

Aggregation engine 420 and aggregation engine 422 function in a similar manner. In some examples, aggregation engine 422 is operated by a different entity than the entity that operates aggregation engine 420. This may be because the data collected by aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the aggregation engine 422, and some of components 410-418 and elements of active unified data layer 308.

Figure 5:
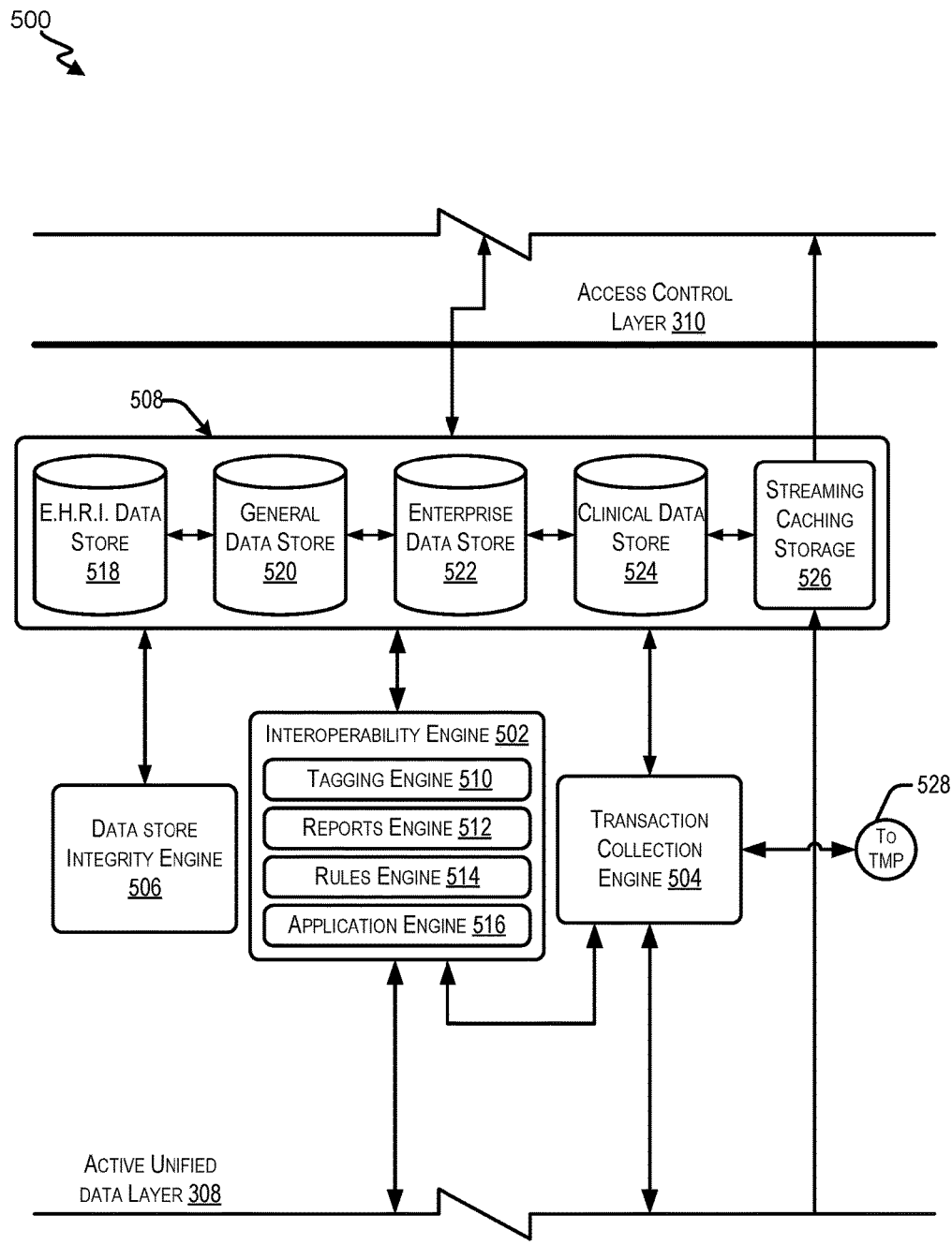
FIG. 5 illustrates a block diagram of a portion of the architecture stack, in accordance with certain embodiments of the present disclosure.

Referring next to FIG. 5, a diagram 500 is shown that depicts a portion of architecture stack 300 according to an embodiment of the invention. In particular, diagram 500 includes active unified data layer 308 and a portion of access control layer 310. Active unified data layer 308, as illustrated in diagram 500, includes an interoperability engine 502 (e.g., interoperability engine 220), a interaction control collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Interaction control collection engine 504 is implemented as part of control engine 106. Interaction control collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a premises, a message type, and a message control identification (ID). The unique message identifier can also be the message control ID. The unique message identifier may be created as messages including data are transmitted from aggregation layer 304. The table may be stored in association with the interaction control platform 528.

In some examples, the table also includes information for tracking the progress of the message from an origination node to a destination node. For example, typically when a message (e.g., any communication of data) is first received by transformative processing engine 108 (e.g., interoperability engine 502), control engine 106 (e.g., interaction control collection engine 504 of control engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to control engine 106 that it saw the message. In this manner, control engine 106 may enable end-to-end tracking of messages for the life of the message.

In one example, the messages are requests. The requests may be generated based om input at one of the components. The requests may be received by transformative processing engine 108 and integrated into the system. In some examples, control engine 106 may be notified that the requests have been received and may therefore be configured to generate message IDs for each request. These message IDs may then be associated with each of the requests. As the requests continue to move throughout the interaction system (e.g., away from transformative processing engine 108), control engine 106 may be track their movement using the message IDs. If one of the requests does not make it to its destination, control engine 106 (or part of the interaction control platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, control engine 106 (e.g., interaction control collection engine 504 of control engine 106) may receive the message and/or message identifier directly from one of components 410-418. For example, one of components 410-416 may be configured to generate the unique message identifier and/or communicate directly with control engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, interaction control collection engine 504 provides unique message identifiers to other elements of the interaction system to monitor the messages as they move throughout the interaction system. Interaction control collection engine 504 also provides a portion of the unique message identifiers to an interaction control platform (indicated by a circle 528) for further analysis of the message identifiers. Such analysis may include reconciliation of lost messages, latency reporting, audit control and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by eternal mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against. Other examples, of metadata that may be included in one or more fields include author, document type, creation time and date, last update time and date, upload time and data, geographic location, unique ID associated with the client or premises where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words. In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and control operational rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. In some examples, the operational data ware house 522 includes data pertaining to decision making as discussed herein and other data typically used by conventional operational concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, interactional, secure, database server with built-in search and a full suite of application services. An example of such a unified system may be Marklogic. Entity-based data store 524 can support data aggregation, data structuring, data indexing, data tagging and mapping to semantic standards, concept matching, concept extraction, machine learning algorithms, concept discovery, concept mining, and transformation of record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
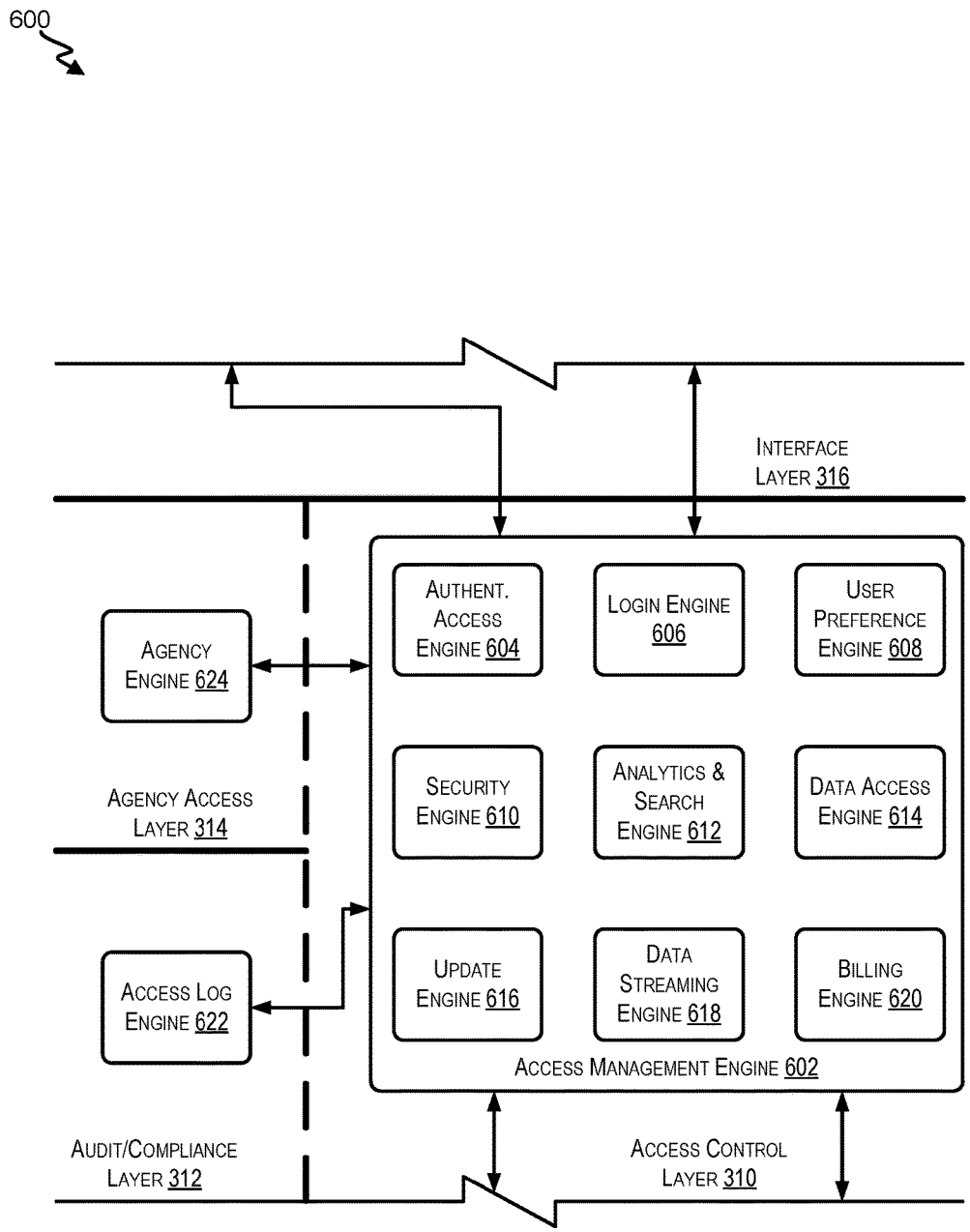
FIG. 6 illustrates a block diagram of a portion of the architecture stack, in accordance with certain embodiments of the present disclosure.

FIG. 6 shows a diagram 600 which depicts a portion of architecture stack 300 according to an embodiment of the invention. In particular, the diagram 600 includes access control layer 310, audit/compliance layer 312, agency layer 314, and a portion of interface layer 316. Access control layer 310, as illustrated in the diagram 600, includes an access control engine 602. Access control engine 602 is an example of access control engine 222. Generally, access control engine 602 can be configured to control access to elements of transformative integration engine 202 by different components, applications, and user devices.

Access control engine 602 within access control layer 310 also provides functionality similar to an operating system. For example, access control engine 602 includes a plurality of engines configured to control different aspects of interacting with elements of the interaction system. For example, a user who desires to access portions of data retained in data store 508, may do so by interacting with access control engine 602 using one or more applications (not shown). Thus, access control engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access control engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings.

For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may control which users can access parts of the interaction system, data access engine 614 may control how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access control engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access control engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. For example, agencies that may use agency engine 624 include agencies to which the interaction system provides compliance, tracking, or other reporting information. For example, agency engine 624 may be used to track one or more performance indicators identified by a government agency and/or to provide report instances of defined types of events. Thus, in some examples, a government agency uses agency engine 624 to collect data pertaining to compliance of the interaction system with one or more statutes or regulations. In some examples, a university is an agency that uses agency engine 624 to collect data pertaining to one or more studies. In some examples, agency engine 624 can identify one or more entities (e.g., governmental agencies) that are to receive reports pertaining to operations or events and what types of data are to be reported to those entities. Agency engine 624 can then collect the pertinent data, potentially format and/or analyze the data, and facilitate transmission of (e.g., raw, formatted and/or analysis of) the data to the appropriate agency.

Figure 7:
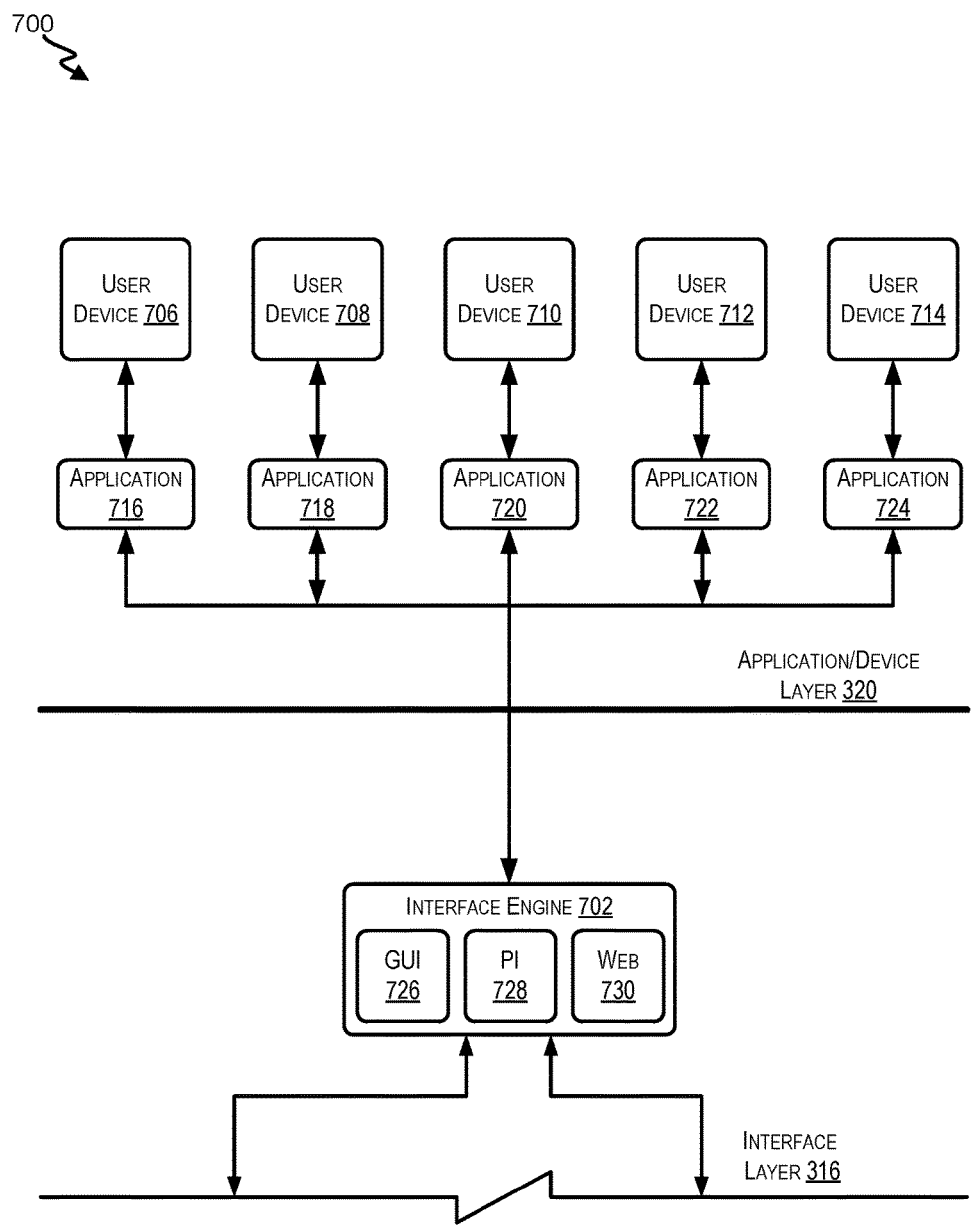
FIG. 7 illustrates a block diagram of a portion of the architecture stack, in accordance with certain embodiments of the present disclosure.

FIG. 7 shows a diagram 700 which depicts a portion of architecture stack 300 according to an embodiment of the invention. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access control layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive input, present dynamic presentations that depend on input, and otherwise respond to input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for an particular entity. In some examples, application 720 may present different data depending on a specialty associated with the entity and protected information associated with the entity.

In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unprompted alerts, adjust display of content, move more relevant content to the foreground, move less relevant content to the background, populate forms for the entity.

In another example, application 722 may be specific for nurses or types of nurses. In this example, application 722 may include dashboards, widgets, windows, icons, and the like that are customized to individual nurses. Similar to the example discussed above pertaining to the doctor, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to control entities constitute the population of the entities within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

In some examples, application 724 may be an operational intelligence application. In this example, application 724 is used to display operational information generated by components of the interaction system. This operational information can be used for operations, programming, and forecasting. Such operational information may include data because such data may impact operations, programming, forecasting, and the like. Accordingly, application 724 may present de-identified information in the form of one or more metrics, indicators, or the like as they pertain to operational intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
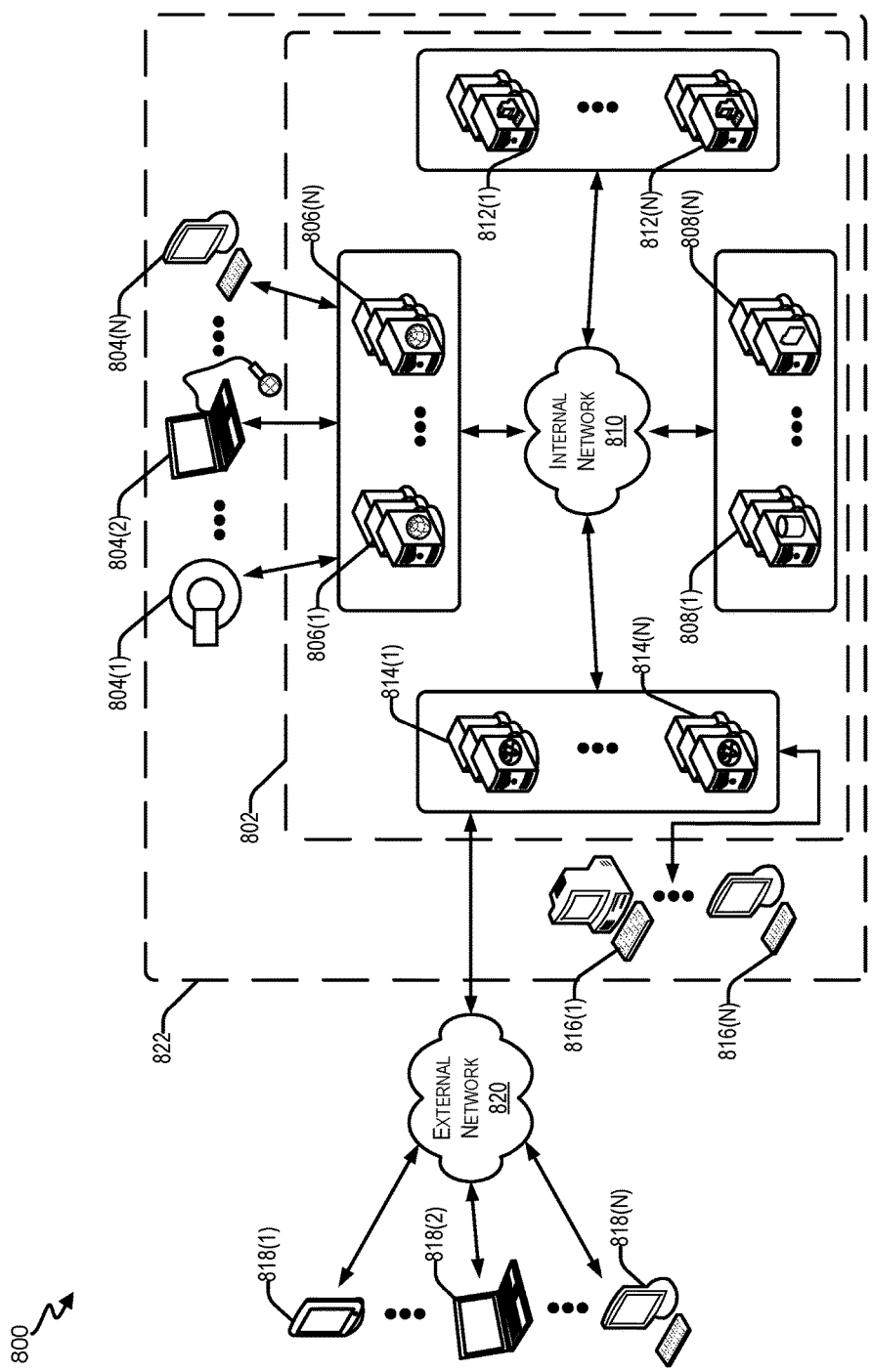
FIG. 8 illustrates a block diagram of an interaction system, in accordance with certain embodiments of the present disclosure.

Turning now to FIG. 8, an interaction system 800 is shown in accordance with an embodiment of the invention. Interaction system 800 includes an internal system 822 including a transformative integration engine 802. The transformative integration engine 802 is an example of transformative integration engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal system 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access control servers 812(1)-812(N) control access to the data retained in the data storage servers 808(1)-808(N). Access control servers 812(1)-812(N) communicate with the other elements of interaction system 800 via internal network 810 and in accordance with access control layer 310. Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

Certain embodiments according to the present disclosure may provide technological improvements for tracking performance metrics of resource-allocation systems. In various instances, resource-allocation systems may be internal to a premises or external to the premises. Technological improvements may be provided by a multi-tier resource and load orchestration system (herein referenced as "load orchestration system") may include a process scheduling subsystem configured to coordinate with resource-allocation systems to schedule resources to perform specified processes with specified loads. The resources may be internal to a premises and/or external to the premises.

In some embodiments, one of the technological improvements may be embodied by a scheduler, which may be a component of the load orchestration system, may generate and/or access a process definition to be assigned to a resource-allocation system. Each process can be associated with one or more performance times, which can include, for example, an absolute time (e.g., date and time) or time period at or during which (for example) it may be desired that part or all of the process may be to be completed. For example, it can be desired that a resource can service a load at a time within a target time period.

In some embodiments, the scheduler can generate a first signal that indicates that the system may be accepting potential resources to perform the process. The first signal can include the target time. The first signal can be sent to each of one or more resource-allocation systems, which are configured to control resources capable of performing processes. The scheduler can receive a second signal from each of a subset (e.g., an incomplete or complete subset) of the set that includes an offer to accept an assignment of the process. Thus, the second signal can correspond to an indication that a resource managed by the associated resource-allocation system may be available to perform the process in compliance with the target time. The scheduler can then select a resource-allocation system to which the process may be assigned, and the scheduler may transmit a third signal to the selected system that may be indicative of the assignment.

In some embodiments, the scheduler can select between resource-allocation systems with regard to identifying systems to receive the first signal and/or to identifying a system to be assigned the process. This selection can be biased based at least in part on a respective metric of each of one or more systems. The metric can be based at least in part on performance characteristics of previously assigned processes, such as whether a particular portion (or all) of a process was completed by a target time or within a target time (e.g., time window). The same or a different metric can also relate to, for example, a current or previous delay or reliability of responding to indications of acceptances of offers for processes or assignments of a process. In a similar manner, the scheduler can, in certain embodiments, select between particular resources based at least in part on a respective metric of each of one or more resources, which may be used to bias the selection.

In some instances, the scheduler further identifies a type of process-performing resource suited to handle a particular process by, e.g., identifying a characteristic of a load involved in the process and mapping the load characteristic to a resource type. For example, an identifier of a load to be involved in a process can be used to retrieve an electronic record that associates the load identifier along with an indication as to whether any particular capabilities are required for appropriate performance of the process. The selection (regarding which system(s) are to receive the first signal and/or which system may be assigned the process) can further be based at least in part on data indicating which systems control at least one resource of the identified type. Once a process has been assigned to a resource-allocating system, the scheduler can maintain communication with the resource-allocating system so as to monitor data pertinent to actual or expected progress of completion of the process. This progress can reflect how timely particular resources were positioned and/or prepared to accept loads of assigned processes.

Figure 9:
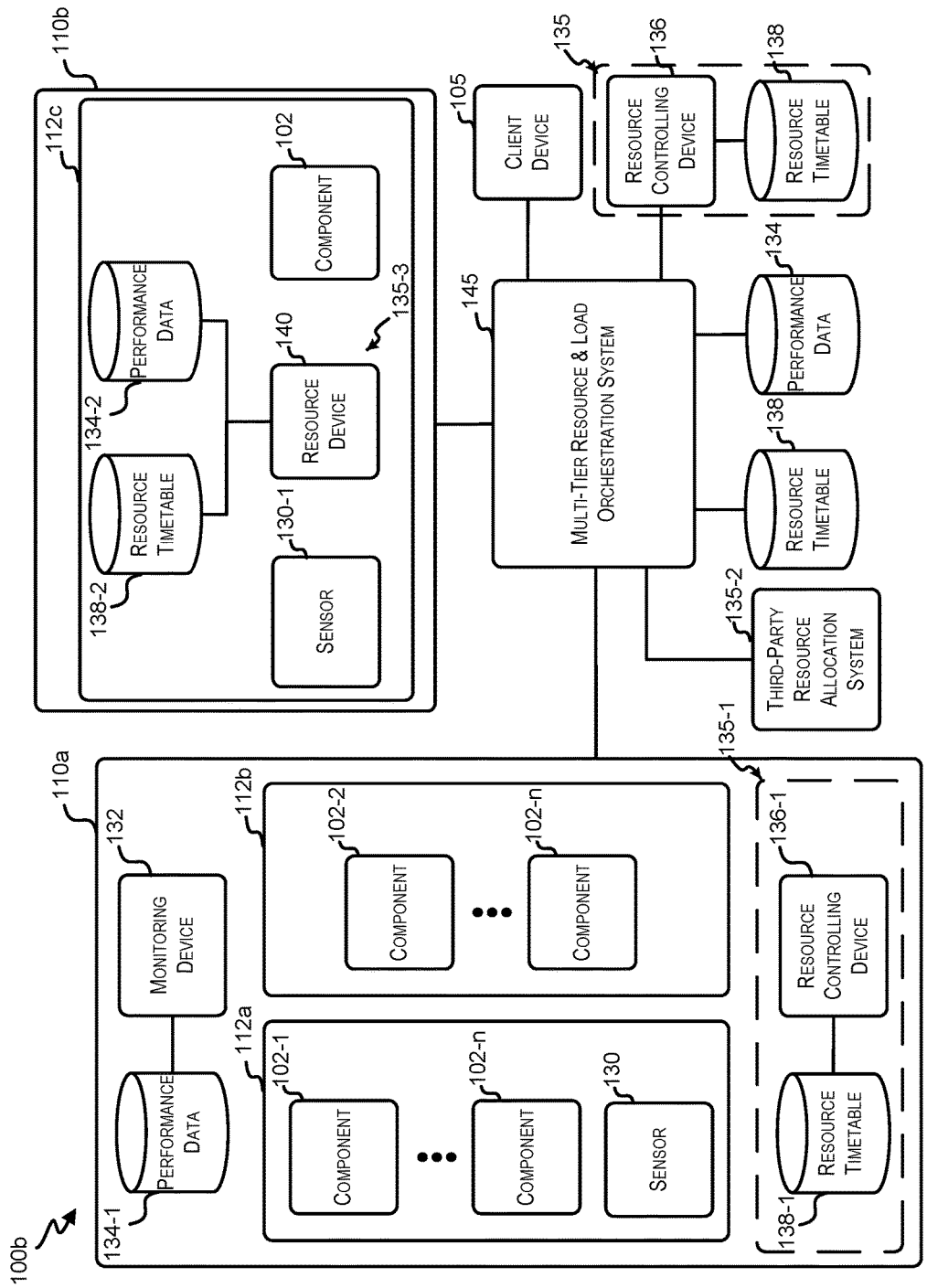
FIG. 9 illustrates a block diagram of an interaction system, in accordance with certain embodiments of the present disclosure.

Referring next to FIG. 9, illustrated is a block diagram of an interaction system 100b, in accordance with certain embodiments of the present disclosure. The interaction system 100b corresponds to a number of technological improvements disclosed herein. Generally, in the interaction system 100b, data can be generated at one or more of the system components 102 and/or the devices 104. The depicted instance shows two premises 110a, 110b. Other embodiments may include any different number of premises. Each premises 110 can include one or more units 112. In the depicted instance, a first premises 110a includes two units 112a and 112b, and a second premises 110b includes one unit 112c.

Each unit 112 may correspond to a particular space. Units within a given premises (e.g., 112a and 112b) may be geographically separated from each other. In one instance, each of at least some units 112 within a premises may be of a same or similar type; may be configured for a same or similar type of use and/or may have one or more same or similar specifications or characteristics (e.g., dimensions, sizes, or intra-unit components). In one instance, each of at least some units 112 within a premises may be of different types, may be configured for different types of use and/or may have one or more different specifications or characteristics.

Within each unit may be one or more components 102 and/or one or more sensors 130. In various embodiments, a given component 102 and/or sensor 130 may, or may not, be fixed in place (i.e., stationary), restrained to limit mobility or fully movable. A component 102 may be configured to be used by an operator or user.

A sensor 130 may include, for example, a sensor configured to monitor a characteristic of an ambient environment (e.g., motion, light, temperature or humidity) or a characteristic of a load. In one instance, a sensor 130 may be a sensor coupled to a component 102. For example, a sensor 130 may be configured to detect whether an added weight has been placed on part of a component. As another example, a sensor 130 may be included within an electronic tag reader component so as to detect electronic tag signals (e.g., a RFID signal, RuBee signal) from the electronic tag/transponder, which may be excited by signal emitted from an antenna of the electronic tag reader component. As yet another example, a sensor 130 may be included within an equipment-tracking component so as to detect equipment tags. As still another example, a sensor 130 may include a receiver to receive signals from one or more signal sources (e.g., GPS satellites or Wi-Fi access points) to enable identifying a location of a device coupled to or including the sensor.

A component 102 and/or sensor 130 may be configured to transmit electronic communications to one or more other electronic devices. The electronic communications may be transmitted, for example, upon detecting a new type of signal (e.g., detecting a presence of a new device); at regular times or intervals; upon receiving a request; and/or upon detecting that a transmission condition has been satisfied. The electronic communication may be transmitted to a device that may be near or remote from the component and/or sensor. The electronic communication may include (for example) sensor-collected data, inputs received at a component, an indication that an event has been detected, an indication that a transmission condition has been satisfied, an identifier of the component or sensor, and/or a location of the component or sensor. The electronic communication may be transmitted, for example, over a wireless network, Wi-Fi network, short-range network, Bluetooth network, local area network, and so on.

A premises 110 may also include a monitoring device 132, which may track a use characteristic of a resource (e.g., a unit or component). The use characteristic can include, for example, when, how or by whom a resource may be being used. In various instances, monitoring device 132 may or may not be located within a unit 112 and/or premises 110. In some instances, monitoring device 132 can be configured to receive input (e.g., from an authorized user), which may indicate a use characteristic (e.g., that a scheduled or unscheduled use may be beginning or has ended, a time that a use has started or completed, an entity engaged in a use, and so on).

In some instances, the monitoring device 132 may be (e.g., via a wireless or wired connection) connected to one or more components 102 and/or one or more sensors 130. Such connections may enable monitoring device 132 to estimate a usage characteristic. For example, one or more intensity values (or a processed version thereof) from a light sensor or motion sensor may be compared to a threshold, and it may be determined that a unit may be not being used if the value(s) are below a threshold. As another example, it may be estimated that a unit may be in use so long as a particular type of component may be detected as being within the unit. As yet another example, it may be estimated that a unit may be in use when signals from a badge reader indicate that at least one person remains in the unit.

The monitoring device 132 can control and update performance data store 134. Performance data store 134 can include performance data for, e.g., particular resource-allocation systems, particular resources, data resource types, components, units, premises, entities (e.g., clients), and/or use types. The performance data may include historical performance data (e.g., efficiency, timeliness, transitions times a date, duration, time, use type, etc., of one or more uses) and/or statistics based thereupon, and/or any other type of performance data suitable for embodiments disclosed herein. Thus, for example, performance data 134 may indicate, for a given unit, use type, and client, an average and variability of a duration of use of the unit by the client for the use type. Additional examples are disclosed further herein. Performance data store 134 may, but need not, be part of monitoring device 132. In some instances, performance data store 134 may be remote from monitoring device 132, one or more units, one or more components and/or one or more premises to which it pertains. In one instances, performance data store 134 may be in the cloud.

The interaction system 100b can include and/or be communicatively coupled to one or more resource-allocation systems 135. In some embodiments, a load orchestration system 145 may include one or more of the resource-allocation systems 135. In some embodiments, one or more of the resource-allocation systems 135 may correspond to third-party resource-allocation systems 135-2. A third-party resource-allocation system 135-2 may be in control of certain resources external to the premises 110.

In some embodiments, one or more of the resource-allocation systems 135 may include controlling devices 136. Each controlling device 136 can control and update a resource timetable for one or more resources (e.g., component or unit). The timetable may include a schedule that indicates that particular blocks of times have been assigned to (or held for) particular entities or uses and/or that other particular blocks of times remain available for assignment. An assigned block may include or may be associated with one or more buffer time periods, such as a buffer time period to prepare a resource and/or a buffer time period to restore (e.g., clean) a resource.

In one instance, a controlling device 136 can be located within a premises or unit that includes, controls or may be a resource pertaining to a resource timetable. In one instance, a controlling device 136 may be located remote from a premises or unit that includes, controls or may be a resource pertaining to a resource timetable. In some instances, a single resource device 140 may act both as a monitoring device 132 and controlling device 136. In some instances, a single resource-allocation system 135 may act both as a monitoring device 132 and controlling device 136.

The controlling device 136 may be configured to locally detect user input or to receive communications that identify user input, where the user input may identify a parameter for the resource timetable and/or a request. As one example, one or more detected parameters may identify a start time (e.g., date and/or time of day), end time, duration, entity, or client and/or use type for a time-block assignment. The controlling device 136 may then verify that a time block consistent with the parameter(s) may be available within a timetable and may generate an assignment of the time block to the client and/or for the use type. Generating the assignment may include updating a resource timetable data store 138 (e.g., which may be included within and/or remote from controlling device 136) so as to reflect the assignment and/or change an availability status of the assigned time period. Generating the assignment may also include or may trigger transmitting a communication to another device (e.g., a client device 105 or load orchestration system 120). The communication may identify one or more parameters of the assignment.

As another example, a request may include a request to identify general availabilities that correspond to identified times (e.g., an identified date range). As yet another example, a request may include a request to identify time periods available for a particular entity, which may include general availabilities and time periods being held for that entity. As yet another example, the monitoring device 132 may receive a communication that identifies one or more parameters for a proposed assignment. The monitoring device 132 may present information corresponding to the proposed assignment via a user interface and may detect input indicating whether it has been accepted. If so, the assignment may be generated. If not, a response communication may be transmitted indicating this lack of acceptance, which may also include one or more other time blocks proposed for assignment.

The load orchestration system 145 may correspond to a number of technological improvements as disclosed herein. To facilitate the technological improvements, the load orchestration system 145 may communicate with one or more: components 102, client devices 105, sensors 130, monitoring devices 132 and/or controlling devices 136. The load orchestration system 145 may itself control and/or update a performance data store 134 and/or resource timetable data store 138. In some instances, part or all of one or both of these data stores may mirror other corresponding data stores (e.g., located at and/or controlled by devices at one or more premises). For example, the load orchestration system 145 may receive periodic communications (e.g., that may, but need not, be responsive to requests for such) from one or more controlling devices 136 and/or monitoring devices 132 that identify an update of a timetable associated with a particular premises, unit or resource or an update of usage data associated with a particular entity, use type, premises, unit or resource. The load orchestration system 145 may update a corresponding data structure in a mirrored resource timetable data structure and/or usage data structure.

In one instance, the load orchestration system 145 may communicate with an independent server or device that manages resource timetables (e.g., by receiving communications from a plurality of controlling devices controlling individual resource timetables and by updating an aggregated data structure to reflect current assignments and availabilities). Such communications may enable the load orchestration system 145 to efficiently query multiple resource timetables and/or identify availabilities.

The load orchestration system 145 provides a number of technological improvements disclosed herein by facilitating handling of assignment requests, timetable control, and/or resource assignments as disclosed below. For example, the load orchestration system 145 may receive an electronic request from a client device 105 to generate a process assignment. Assigning a client-associated process to a given resource can include, for example, reserving a space and/or resource usage for the client for a designated time period such that the client can perform a process at the space during the designated time period. The client device 105 may correspond to a user device. The client device 105 may include, for example, a server, desktop computer, laptop computer, tablet or smart phone. The client device 105 may be configured to transmit and receive communications over a network, such as over a Wi-Fi network and/or short-range network. In various instances, a given client may be associated with multiple client devices 105 or a single client device 105. In some instances, the client device 105 includes a device associated with a particular physician, surgeon, or practice group, such as a device of a secretary, administrator, physician, surgeon or other user who may be coordinating scheduling of procedures. The client device 105 may include a device configured to receive user input that identifies scheduling constraints and/or preferences for the electronic request. Each client device 105 may be associated with additional data that may be added to a request (e.g., before transmission or after receiving the request). The electronic request may, but need not, include or be associated with one or more parameters, such as a time or time period (e.g., date range, date and time of day), geographic location (e.g., of a client device or requested unit or resource), use type, and/or process-assignment duration.

The load orchestration system 145 may query a local or remote data store to identify usage data associated with at least one of the parameters. For example, the query may be to identify a maximum and minimum time of previous uses associated with a client and a use type corresponding to the request. As another example, the query may be to identify a percentage of instances in which a usage duration of a unit exceeded a requested usage duration for a particular client corresponding to the request. As yet another example, the query may be to identify all usage durations associated with a particular use type and premises corresponding to the request and with a recent time period, so as to enable the load orchestration system 145 to generate a use statistic (e.g., a median use time).

Based at least in part on the usage data, the load orchestration system 145 may determine whether and/or how to transform the request. For example, if usage data indicates that an actual usage time may be likely to exceed a requested usage time, the requested usage time may be transformed into a new requested usage time based at least in part on the usage data. The new requested usage time may then be used to identify any availabilities in resource timetables that sufficiently correspond to the request. A determination as to whether an actual usage time may be likely to exceed a requested usage time may include determining whether an actual usage time has exceeded a requested usage time for at least a threshold percentage of past instances or determining whether a statistic generated based at least in part on actual usage time exceeds a statistic generated based at least in part on requested usage time (e.g., an average or median time). Thus, in various instances, a requested usage time may be transformed into a new requested usage time in all instances or in a conditional manner.

A new requested usage time may be identified as corresponding to a usage statistic. For example, a new requested usage time may be identified by identifying an average (or median or percentile mark) extent to which previous requested usage times differed from corresponding actual usage times and factoring a requested usage time of the present request by the average. As another example, a machine-learning technique (e.g., a neural network) may be used to generate an explicit or hidden relationship between inputs (e.g., request parameters and/or resource timetables) and a new requested usage time. As yet another example, a fixed relative (e.g., 15%) or absolute (e.g., 30 minute) addition may be added to the requested usage time when it may be determined that the requested usage time may be to be transformed.

The load orchestration system 145 may then facilitate assigning a resource in response to the request. The facilitation may include generating and transmitting a transformed request to one or more controlling devices 136. In some instances, the transformed request includes modified and/or additional parameters as compared to a request received from a client request. For example, a transformed request may include a request with a new requested usage time.

The facilitation may include identifying an availability in a resource timetable for the request. For example, the load orchestration system 145 may query a resource timetable data store 138 that may be local to and/or controlled by the system to identify availabilities in a timetable of a resource that would correspond to the request (e.g., and transformed usage data). If multiple corresponding availabilities are identified, the load orchestration system 145 may (in some instances) select a single availability based at least in part on a selection technique (e.g., to bias or select based at least in part on how soon the availability may be, how geographically close the resource may be to a location associated with the electronic request, a client preference, and so on). Whether a single availability or multiple availabilities are identified, the load orchestration system 145 may transmit a communication to a controlling device 136 that identifies information associated with the request and the availability(ies) and/or a communication to client device 105 that identifies information associated with the availability(ies) (e.g., a time, resource identifier, resource location, resource specification, etc.).

The one or more controlling devices 136 (e.g., to which a transformed request may be transmitted and/or for which timetables are considered to identify request-corresponding availabilities) may include, for example, a device corresponding to each of one or more specifically identified resources in a request from a client, a device corresponding to each of one or more resources satisfying a location criterion (e.g., being located within a defined absolute or relative distance from a location associated with the request or client device), a device corresponding to each of one or more resources having a specification corresponding to a process type (e.g., usage type) associated with the request, a device corresponding to one or more institutions having an affiliation matching an affiliation associated with the request, and so on.

The interaction system 100b facilitates coordinated monitoring and updating of multiple timetables and usage data. The load orchestration system 145 may thus be configured to evaluate multiple independently managed timetables to identify a resource availability for a particular request. Further, compilation of usage data may enable usage statistics to be aggregated across data stores with respect to particular single or multiple indices (e.g., clients, process types, time periods, etc.) to improve the accuracy of the statistics. Further, network configuration between devices can improve the efficiency of responding to a client request: the load orchestration system 145 may routinely monitor multiple and diverse resource timetables and usage data, such that it can send request parameters to controlling devices in a targeted and informed manner, so as to avoid unsatisfactory responses triggering a long communication iteration with devices. Further yet, the transformation of requested usage time based at least in part on empirical usage data promotes efficient assignments of resources.

Figure 10:
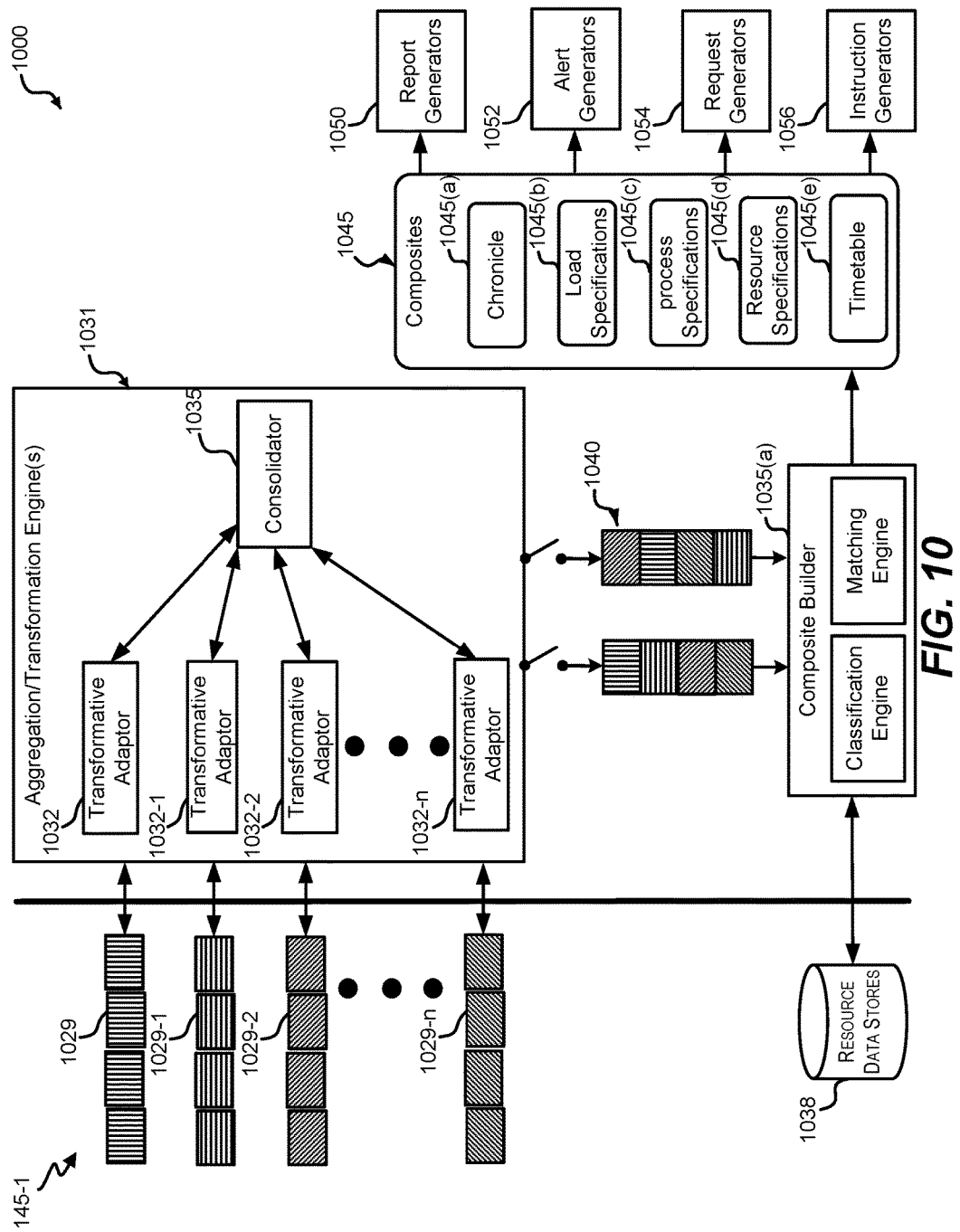
FIG. 10 illustrates a diagram of a portion of a load orchestration system, in accordance with certain embodiments of the present disclosure.

Turning next to FIG. 10, illustrated is a diagram that depicts a portion of the load orchestration system 145 according to certain embodiments of the present disclosure. The load orchestration system 145 provides a number of technological improvements disclosed herein with one or more aggregation and/or transformation engines 1031. In various embodiments, the aggregation and/or transformation engines 1031 may correspond to a single, integral engine or separate engines working in conjunction. The aggregation/transformation engines 1031 may transform, translate, or otherwise adjust data collected.

The aggregation/transformation engines 1031 may utilize any one or combination of the interfaces disclosed above as one or more content acquisition interfaces configured to allow the aggregation/transformation engines 1031 to gather data 1029 from data sources corresponding to any one or combination of the sources of load-related data, resource data, location data, and/or the like disclosed herein to facilitate the load orchestration features disclosed herein. The data 1029, which may include multiple data streams, may be received via one or more networks, such as a local area network, a Wi-Fi network, or the Internet, from multiple sources (e.g., from a single premises or multiple premises), such as a component or user device that collects at least some of the data included in each data element based at least in part on inputs detected at the device or measurements made by a sensor of the device. In some instances, the data may be collected immediately, or with some delay (e.g., so as to be at an end of a data-collection effort) appended to a data stream transmitted directly or indirectly to the engines 1031. In some instances, collected data can be locally or remotely stored and subsequently retrieved (e.g., by a same or different device) to append to a stream. A managing server may then, at a defined time or upon detecting a defined type of event (e.g., receiving a data request or detecting a threshold size of a data stream), retrieve the stored data and append the data (e.g., in raw or processed form) to a stream. Thus, a source of a stream may be a single component or user device or an intermediate device or system that collects data from multiple components and/or user devices.

The received data 1029 includes individual data elements, which may correspond to data collected with respect to requests to perform one or more processes, requests for resources to perform one or more processes, requested load-acquisition times and/or time windows for load acquisition, actual load-acquisition times, process performance statuses, resource statuses and availabilities, time data corresponding to resource availabilities, location data and time data corresponding to locations of resources at particular times, location data and time data corresponding to locations of loads at particular times, time data corresponding to load availabilities and needs, load specifications, process specifications, and/or the like to facilitate various features of load orchestration disclosed herein. In various embodiments, the data 1029 may correspond to any one or combination of raw data, unstructured data, structured data, information, and/or content which may include media content, text, documents, files, instructions, code, executable files, images, video, audio, and/or any other suitable content suitable for embodiments of the present disclosure. In various instances, data from 10, 100, or any number of different sources may be merged together with data generated internally, data previously received, data from third parties, etc.

By way of example, the aggregation/transformation engines 1031 may identify which data and records are about the same load, resource, entity, and/or the like, and may merge attributes from different sources into preliminary composites 1040 and particularized composite packages 1045 that can be used by the load orchestration system 145 as a basis for services provided with respect to the particular load, resource, entity, and/or the like. In some embodiments, a particularized composite package 1045 may include or otherwise facilitate a transition and resource-allocation program for a particular load.

The load orchestration system 145 may, in some embodiments, include a multi-server system that may include specialized data-pulling engines and stream processing engines (e.g., each engine being a server or processing core). According to certain embodiments, with data-pulling engines, at least some of the data may be actively gathered and/or pulled from one the or more data sources, for example, by accessing a third party repository and/or by "crawling" various repositories. A stream processing engine may be specialized so as to include, for example, stream processors and fast memory buses. In some embodiments, data elements of the received data 1029 may be separated, for example, within a stream via a particular (or one of multiple particular) characters or strings, or data elements may begin or end with a particular (or one of multiple particular) characters or strings. In some embodiments, the one or more content acquisition interfaces may include one or more APIs that define protocols and routines for interfacing with the data sources via an API interface. The APIs may specify API calls to/from data source systems. In some embodiments, the APIs may include a plug-in to integrate with an application of a data source system. The one or more data acquisition interfaces, in some embodiments, could use a number of API translation profiles configured to allow interface with the one or more additional applications of the data sources to access data (e.g., a database or other data store) of the data sources. The API translation profiles may translate the protocols and routines of the data source system to integrate at least temporarily with the system and allow communication with the system by way of API calls.

In some embodiments, the data 1029 acquired may be in different formats, according to different data standards, in different document structures, including different types of data, etc. The data 1029 can then be transformed, translated, or otherwise adjusted by the engines 1031. For example, acquired data may be converted from a first format to a second format using one or more conversion rules, which may be user-defined, heuristic, and/or machine-learned. In some embodiments, the engines 1031 may perform similar operations with respect to other data generated by elements of the interaction architecture. In some embodiments, the aggregation and/or transformation engines 1031 may correspond at least in part to one or more of transformative integration engine 108, control engine 106, aggregation engine 218, 420, third party aggregation engine 422, and/or interoperability engine 502.

In some embodiments, the aggregation and/or transformation engines 1031 may include one or more transformative adaptors 1032. In some embodiments, one or more transformative adaptors 1032 may be associated with the content acquisition interfaces to effect the transformations. The transformative adaptors 1032 may be implemented, in various embodiments, in hardware and/or software. In some embodiments, a transformative adaptor 1032 may include a hardware device and/or software component that transforms, translates, converts, or otherwise adjusts the acquired data 1029. In some embodiments, the one or more transformative adaptors 1032 may correspond at least in part to one or more of adaptors 424, 426, 428.

In some embodiments, various processors and/or layers within the load orchestration system 145 may can be specialized to perform various types of processes. For example, a first set of processors may be configured to transform the data 1029 within a stream in real-time (e.g., to produce data in a standard format and/or one that corresponds to an alert, notification, and/or report protocol) and detect (e.g., based at least in part on data included in a header of a data element) whether the transformed data includes one or more particular types of data. In various embodiments, the first set of processors may utilize the transformative adaptors 1032 to effect the transformation and/or may further transform the data beyond first-stage transformations by the transformative adaptors 1032.

The aggregation/transformation engines 1031 may process manifold data sets that may, for instance, come from different sources or the same source, for example, by way of one or more updates to data previously provided by a particular source, and the consolidator 1035 may consolidate the data sets to form a preliminary composite 1040. The consolidation may include applying one or more filtering techniques (or one or more filters) to the data sets, organizing, categorizing, qualifying, and/or comparing the sets of information; detecting, identifying, and/or handling errors/discrepancies; identifying redundancies; removing redundancies; discarding data irrelevant to composite package building for particular loads, resources, and operations; and/or otherwise processing the data sets. The consolidator 1035 may determine whether each element includes a data pattern that may be consistent with one or more defined protocols. A protocol may define a data pattern as one that includes, for example, one or more particular data elements and/or types of data elements. The consolidator 1035 may identify one or more applicable protocols (e.g., based at least in part on source identifier, metadata, a current time, a stream identifier, etc.).

In some embodiments, the consolidation may be performed upon detection of one or more particular data elements 1029. One or more first-stage processors of the engines 1031, which may correspond to the consolidator 1035, may form one or more preliminary composites 1040 from consolidated data. The one or more first-stage processors may transmit the one or more preliminary composites 1040 (or replicated versions thereof) to one or more second-stage processors, which may correspond to a composite builder 1035(*a*). The load orchestration system 145 provides a number of technological improvements disclosed herein with the composite builder 1035(*a*). The composite builder 1035(*a*), which may or may not be integral with the engines 1031 in various embodiments, may build particularized composite packages 1045. The composite builder 1035(*a*) may be configured to perform extraction, apply a rule to process the extracted data element, request, and/or retrieve supplemental data from a remote data source 1038, and/or develop composite packages 1045 with the supplemental data. Further, in some embodiments, the composite builder 1035(*a*) may include a classification engine and a matching engine configured to facilitate classifying and matching features disclosed herein.

The one or more data stores 1038 may correspond to any one or combination of the data stores disclosed herein. In some embodiments, the composite builder 1045(*a*) may pull from the data stores 1038 stored composite packages 1045, previously created by the composite builder 1035(*a*), to update the stored composite packages 1045 based at least in part on data 1029 newly received and processed. In some embodiments, the composite builder 1045(*a*) may pull from the data stores 1038 data pertinent to the composite package 1045 to supplement data 1029 newly received and processed in order to create and/or update the composite package 1045. In some embodiments, the supplemental data can include, for example, template data and/or data previously collected and pertinent to forming a chronicle 1045(*a*), load specifications 1045(*b*), process specifications 1045(*c*), resource specifications 1045(*d*), and/or a timetable 1045(*e*). Thus, the composite builder 1045(*a*) may use previously stored data and newly collected data 1029 to form and update the composite packages 1045.

In some embodiments, the composite builder 1035(*a*) may transform the preliminary composites 1040 into understandable data, information, and/or content so that the composite packages 1045 contains the transformed data for surfacing at client devices as alerts, notifications, and/or reports. The composite builder 1035(*a*) may identify protocols for alerts, notifications, and/or reports. The various protocols may include one or more general conditions of applications, such as ones that specify for which time periods, premises, locations, data sources, and/or client devices for which the protocol may be to apply. The various protocols may include a flag definition that may specify what types of data indicate that information corresponding to a data element may be to be reported. For example, a flag definition may include an identification of each of one or more composites and/or one or more values associated with each of the one or more composites. The one or more values may include, for example, a numeric, textual or categorical value. The one or more values may include a threshold and/or define a bound for a closed or open range. Thus, for example, a corresponding value included in a data element may be determined to be consistent with the one or more values if it may be within a range (or outside the range—depending on how the protocol may be defined) or exceeds the threshold in a particular direction (e.g., may be above or may be below the threshold). As another example, a corresponding value included in a data element may be determined to be consistent with the one or more values if it may be the same as one (or all) of the one or more values.

In some embodiments, the composite builder 1035(*a*) may attenuate, blur, and/or remove particular elements of the preliminary composites 1040. Blurring an element may include, for example, assigning a numeric composite value to a numeric bin, scrambling letters, assigning a numeric composite value to a functional category, etc. As another example the composite builder 1035(*a*) may selectively permit particular elements to pass according to one or more rules and/or based at least in part on what data may be required to build the composite packages 1045, an original source of a data element, a value (e.g., identifying a location, time stamp, or institution) associated with the data element, a destination, a current time, and/or the like. In various embodiments, a particularized composite package 1045 may include manifold components. The manifold components may include one or more of a chronicle 1045(*a*), load specifications 1045(*b*), process specifications 1045(*c*), resource specifications 1045(*d*), and/or a timetable 1045(*e*). The engines 1031 may create and/or update a chronicle 1045(*a*).

A chronicle 1045(*a*) may include temporally keyed and/or demarcated index of past and current data with respect to a particular load. The chronicle 1045(*a*) may, for example, include time-annotated and date-annotated events pertinent to the load chronologically indexed since origination of the load within the interaction system 100*a*. Load specifications 1045(*b*) may include specifications of load identifiers, load characteristics, and/or the like. Process specifications 1045 (*c*) may include request parameters specifying requested processes (e.g., with a process type) and corresponding time constraints or time windows for performance of the processes (e.g., particular dates or times, date or time ranges, and/or the like). The request parameters may include location parameters.

Resource specifications 1045(*d*) may include request parameters specifying one or more particular resources needed to effect operations specified by the process specifications 1045(*c*) for the particular load specified by the load specifications 1045(*b*). The request parameters may include requested usage time specifications, resource constraints (e.g., pertaining to location, configurations, component availability, size and/or premises affiliation); and/or one or more usage parameters. Timetable 1045(*e*) may include a composite timetable that correlates resource availabilities, resources request times, load locations and corresponding times, and operations times with respect to a particular load.

The composite builder 1035(*a*) may update one or more of the manifold composites, and, hence, the composite packages 1045, in real time, periodically, or when triggered by certain events with respect to the particular load. The composite builder 1035(*a*) may generate one or more feeds of particularized composite packages 1045 transferred to one or more data stores 1038 and/or one or more additional processors of the scheduler 1000. The one or more additional processors may be configured to provide one or more report generators 1050, alert generators 1052, request generators 1054, and/or report generators 1056. The generators may utilize orchestration rules to process at least portions of the composite packages 1045 and generate content for transmissions to effect various embodiments disclosed herein.

The combined data and content may be transmitted to one or more destinations. An address of a destination (e.g., an IP address) may be specified within a rule and/or protocol. Filtered and/or unfiltered, supplemented, and/or un-supplemented data elements can be transmitted to a destination via a discrete and/or continuous transmission. Exemplary types of transmission include, for example, transmission via messages (e.g., email messages, SMTP, or faxes), or file transfer (e.g., via FTP, SSH or other file transfer protocol). A transmission may include one to a single or to multiple defined destinations and/or, in some instances, a broadcast transmission. A transmission may occur, for example, repeatedly, continuously and/or upon detecting a particular event. An event may include, for example, a particular time, passage of a particular time period since a last transmission, detecting one (or a threshold number) of data elements ready for transmission, and/or receiving a request for the data.

Figure 11:
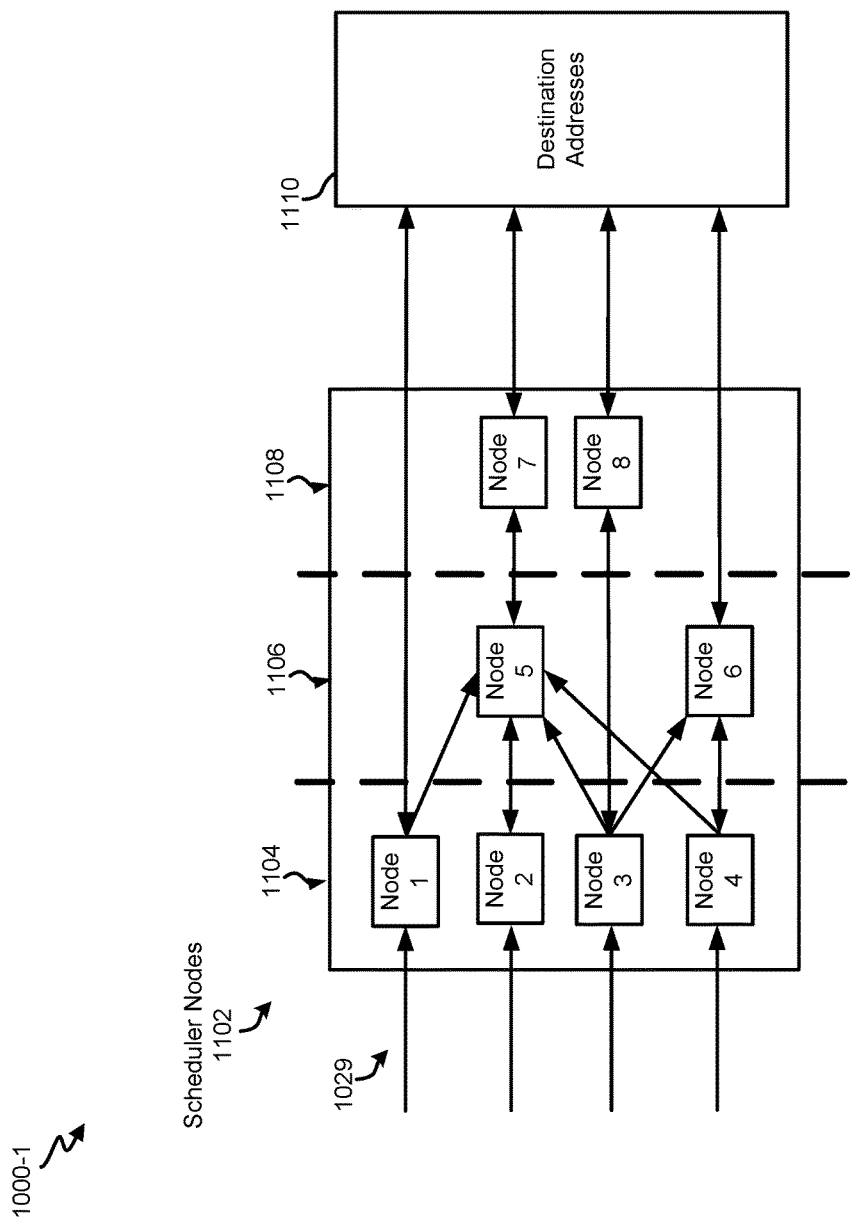
FIG. 11 illustrates a processing flow for a scheduler, in accordance with certain embodiments of the present disclosure.

FIG. 11 shows an illustration of a processing flow across processing nodes for the scheduler 1000, in accordance with certain embodiments of the present disclosure. As depicted, a plurality of data elements 1029 (which may be in streams) are received. The load orchestration system 145 provides a number of technological improvements disclosed herein with the scheduler 1000. The scheduler 1000 may assign each data stream or individual data elements to a processing node from amongst a set of scheduler processing nodes 1102, which may be of the stream processing engine in some embodiments. In some embodiments, each processor node in set of scheduler processing nodes 1102 includes an independent processor and/or network address relative to other nodes in the set. Some or all of the nodes in the set may be co-located or physically distributed.

In some embodiments, the scheduler processing nodes 1102 may include a first node layer 1104 that performs initial processing of data elements. In the depicted instance, nodes 1 through 4 are in the first layer 1104. In some embodiments, the first node layer 1104 may correspond to the aggregation/transformation engines 1031. The scheduler 1000 may identify a node to which to assign a data element or stream based at least in part on, for example, a current or past memory or processor usage of each of one or more nodes; a processing latency of each of one or more nodes; a backlog of each of one or more nodes; and/or a dedication of each of one or more nodes.

Each of one, more, or all nodes in set of nodes 1102 may be configured to perform one or more particular processing processes. For example, nodes 1 through 4 may be configured to assess data in each data element to detect a specified data element. Such processing may be performed, for example, based at least in part on pattern recognition, computing data checksums (e.g., using a defined pattern), generating data products, performing if statements or searches, performing logic operations, etc. Different nodes may be configured to monitor for different data, which may be specified with different protocols.

In some instances, irrespective of whether the particular data may be detected, first-level nodes may route data elements to one or more destination addresses 1110. The one or more destination addresses 1110 may correspond to devices, systems, and/or data stores that are physically separate from set of nodes 1102, such as client devices 105, resource-allocation systems 135, and/or other components communicatively coupled to the load orchestration system 145.

When a first-level node detects a presence of particular data in a data element, the node may send pertinent data (e.g., data element or replicate thereof or extracted data) to one or more nodes in a second layer 1106. In some embodiments, the second layer 1106 may correspond to the composite builder 1035(*a*). When a second-level node detects a presence of particular data in a data element, the node may send pertinent data (e.g., data element, extracted data or an identifier of a data element) to a node of the third layer 1108. In some embodiments, the third layer 1108 may correspond to one or more of the report generators 1050, the alert generators 1052, the request generators 1054, and/or the report generators 1056. The third-level nodes may collect data and generate content to include in reports, alerts, requests, instructions, and/or other communications suitable for embodiments disclosed herein. The third-level nodes may organize, process and/or filter collected data so as to conform with a transition protocol, type of transmission and/or configuration of a destination device. For example, a report may be generated using a schema associated with a destination device. A third-level node may further transform data from one standard (e.g., a base standard) to another (e.g., one associated with a destination). The third-level nodes may cause transmission or storage instantly or upon detecting an event.

Accordingly, a multi-layer distributed processing system may be used to process data (e.g., streaming data) in real-time. A layered node structure can facilitate minimally disrupting a stream (e.g., with regard to transmission latency and/or order disruption) and utilizing parallel processing to quickly detect and report select data. The framework may be also scalable, as nodes can be added to a set when additional data streams are incoming and/or when a density of data elements per stream increases.

Referring again to FIG. 10, the load orchestration system 145 may orchestrate process-performing resources and process specifications particularized to individual loads in various ways according to various embodiments. The scheduler 1000 may receive a set of electronic communications 1029 from one or more client devices 105. The set of electronic communications may include a digital identifier of an individual load. For example, in some embodiments, the digital identifier of the individual load may correspond to any suitable load identifier. In some embodiments, the digital identifier of the individual load may correspond to any suitable resource identifier. The scheduler 1000 may identify, create, and/or develop composite packages 1045 using such digital identifiers to associate the composite packages 1045 with particular loads. For example, the engines 1031 and/or the composite building 1035(*a*) may retrieve, from one or more electronic records and based at least in part on the digital identifier of the individual load, confidential information associated with the individual load The confidential information may include one or more attributes corresponding to one or more of: an indication of a set of one or more conditions of the individual load; an indication of a set of one or more services associated with the individual load; and/or an indication of service equipment associated with the individual load. In some embodiments, the scheduler 1000 may identify requirements for a process-performing resource customized based at least in part on i) the first set of confidential information associated with the load, ii) a first geolocation corresponding to the load, and iii) a second geolocation corresponding to the process.

In some embodiments, the scheduler 1000 may initially create a provisional composite package 1045 for the individual load. For example, the provisional composite package 1045 may include a program for the individual load that specifies processes, resources, locations, and a corresponding timetable. The scheduler 1000 may initially create a provisional composite package 1045 according to a multi-level, hierarchical rules regime, where more general rules are associated with one or more general conditions to match processes, resources, locations, and/or times, and more specific rules associated with one or more sub-conditions to match processes, resources, locations, and/or times. Certain embodiments of the scheduler 1000 may employ a tree structure for the analysis. In some embodiments, the scheduler 1000 may the program to a workflow that may be applicable contingent upon user confirmation. The workflow may include exprogramations describing the overall program, processes, resources, locations, and a corresponding timetable. With some embodiments, where additional information is required in certain circumstances, a decision tree may be presented to gather information. The workflow may include any one or combination of a graphical decision tree, a textual decision tree, a series of prompts configured to walk the provider through a decision tree, a flowchart, an instructional narrative, a list, and/or the like.

In various embodiments, the scheduler 1000 may initially create a provisional composite package 1045 for the individual load at least in part by one or combination of the following. One or more particular processes may be determined based at least in part on the set of electronic communications 1029. In some embodiments, the set of electronic communications 1029 may include an electronic request to perform one or more processes with respect to the individual load and/or a specification of one or more types of process-performing resources. For example, the electronic request may request transition of an individual load between two locations. In some embodiments, the set of electronic communications 1029 may simply specify a type of process-performing resource for the individual load. In such cases, the load orchestration may include inferring a request to perform one or more processes with respect to the individual load by matching the specified type of process-performing resource. In some embodiments, the set of electronic communications 1029 may further include one or more of an indication of a location, an indication of a procedure, and/or an indication of a condition, and the scheduler 1000 may infer a request to perform the process with respect to the individual load based at least in part on classifying the indication(s) to one or more categories and matching the one or more categories to one or more processes.

One or more process-performance locations may be determined based at least in part on the set of electronic communications 1029. The scheduler 1000 may receive a set of electronic communications 1029 from one or more location data sources. In various embodiments, the scheduler 1000 may derive location-based data from the set of electronic communications 1029, which may be at least partially from one or more of an electronic tag sensor, at least one of the one or more client devices, a resource-allocation system, and/or a monitoring device. The set of electronic communications may include location data indicative of a location of the individual load. In some embodiments, a process and the identifying the one or more process-performance locations are further based at least in part on a first location of the individual load and a second location inferred from the request. In some embodiments, the location data may correspond to a destination input received via the staff authenticated user interface facilitated via a client device 105 or another interface disclosed herein. In some instances, the destination input may correspond to an identifier of a second premises, when the individual load is currently located in a first premises. In other instances, the destination input may correspond to an identifier of a second location within a particular premises, when the individual load is currently at a first location within the particular premises.

One or more process-performance times may be determined based at least in part on the set of electronic communications 1029. The scheduler 1000 may process a temporal input received via the set of electronic communications 1029, the temporal input indicative of one or more times and/or one or more time windows. In some embodiments, the scheduler 1000 may access a timetable data store to evaluate resource timetables that indicate capacities to accept processes during particular time periods. In some embodiments, the scheduler 1000 may select the process-performing resource from a set of process-performing resources at least in part by matching the temporal input to at least one of the capacities.

The scheduler 1000 may classify a given process as having a process type according to one or more process classification rules. The scheduler 1000 may match the process type to a type of process-performing resource to service loads classified as having one or more characteristics matching the one or more attributes defined in the electronic records and/or in the confidential information retrieved. A process, as used herein, may include or otherwise correspond to a task, and "process" may be used interchangeably with "task."

The composite builder 1035(a) may access performance data, from a resource data store 1038, which may include any other data stores such as a performance data store 134. The composite builder 1035(a) may identify, based at least in part on the performance data, a process-performance duration that corresponds to one or more of the process type, the type of process-performing resource, the one or more process-performance locations, and/or one or more process-performance times. The composite builder 1035(a) may define a process-assignment duration based at least in part on the process-performance duration.

The scheduler 1000 may transmit electronic communications to one or more resource-controlling devices, the electronic communications including an instruction to perform the process. The scheduler 1000 may detect an availability of a process-performing resource of the type of process-performing resource that is of a duration that is at least as long as the process-assignment duration. The scheduler 1000 may determine a performance time for the process to be performed based at least in part on the availability of the process-performing resource. The scheduler 1000 may transmit, to at least one resource-controlling device, an instruction to perform the process at the performance time. The scheduler 1000 may modify the provisional composite package 1045 for the individual load based at least in part on the performance time and the instruction to the at least one resource-controlling device, the modifying forming an updated composite package 1045. The scheduler 1000 may transmit, to one or more client devices, content indicating at least a portion of the updated composite package 1045.

With certain embodiments, the scheduler 1000 may automatically initiate assignment actions based at least in part on provisional composite package 1045. As an example, the scheduler 1000 may proceed with any one or combination of steps disclosed herein to effect assignment of resources to service the individual load and to initiate load transfer, along with one or more alerts to client devices in order to provide notification of actions initiated and allow for user acceptance, modification, or declination of the actions. The scheduler 1000 may transform the provisional composite package 1045 into an updated, modified, and/or confirmed composite package 1045 when particular resources are assigned, when particular locations of resources and/or loads are detected, when a resource-allocation system, an individual load, a resource, a manager, and or another entity accepts or confirms the program or aspects thereof, and/or when other suitable events occur so that the scheduler 1000 may update, modify, and/or confirm the provisional composite package 1045. In some instances, the scheduler 1000 may create the provisional composite package 1045, form the updated electronic composite, and transmit content to destination addresses (e.g., instructions to resource-controlling devices) prior to receiving an explicit request to perform the process with respect to the individual load.

In some embodiments, the scheduler 1000 may process location-based data, received from one or more location data sources, that indicates a current location of the process-performing resource, which may or may not be during process performance (e.g., transfer) in various embodiments. The scheduler 1000 may predict a timeliness of performance of the process based at least in part on the location-based data. The scheduler 1000 may access a target efficiency metric reflecting a target efficiency of process performance. The scheduler 1000 may identify a second process identified in a flexible process schedule, and determine a second performance time for the second process to be performed based at least in part on the timeliness of performance of the process predicted and the target efficiency metric. The scheduler 1000 may transmit an instruction to perform the second process at the second performance time, and may the composite package 1045 for the individual load based at least in part on the second process and the second performance time. The scheduler 1000 may transmit one or more alerts to one or more client devices, content indicating at least the second process and the second performance time. Such content may presented with a dashboard reflecting the load and resource orchestration, as well as real-time updates on load locations, load statuses, resource locations, resource statuses, timetables, ETAs, descriptive content, and/or the like.

According to certain embodiments, the scheduler 1000 may provide for intelligent orchestration and selection of loads and resources based at least in part on performance metrics (e.g., efficiency metrics and/or reliability metrics), features of which are disclosed further herein. For example, resource selection may be based at least in part on a ranking of resources and/or resource-allocation systems according to the metrics. When balancing multiple loads, the scheduler 1000 may triaged the loads according to triage scores. Such triaged scores may correspond to urgencies of need. Conditions of the loads may be classified according to urgencies of need and scored accordingly, with higher scores reflecting higher urgency. In such cases, the scheduler 1000 may select resources of a certain type according to the performance metrics so as to assign resources and/or resource-allocation systems having higher metrics to loads classified as having more urgent needs, and to assign resources and/or resource-allocation systems having relatively lower metrics to loads classified as having less urgent needs. Thus, resource assignment may be at least partially a function of performance metrics, and current assessments of availabilities and locations of resources.

Certain embodiments may further provide for monitoring resources after assignments of the resources. For example, when a given resource has been requested, the scheduler 1000 may monitor real-time progress (e.g., locations) of the resource toward a load-acquisition points. The scheduler 1000 may make current assessments of the progress of the resource against the time-location thresholds set according to the timetable generated by the scheduler 1000. When one or more comparisons of the progress of the resource against one or more of the time-location thresholds indicate that the progress is insufficient to meet a target time, the scheduler 1000 may search for, and automatically select or generates a notification with a user selectable option for, one or more alternative resources that can meet the target time or at least come closer to meeting the target time that the current resource. In some cases, the scheduler 1000 may determine alternative resources and corresponding alternative target times prior to the current resource failing to meet a progress threshold. Accordingly, certain embodiments allow for dynamic adjustments of and alerts regarding resource programs and resource assignments with respect to individual loads, reactive to real-time monitoring of resource progress.

Figure 12:
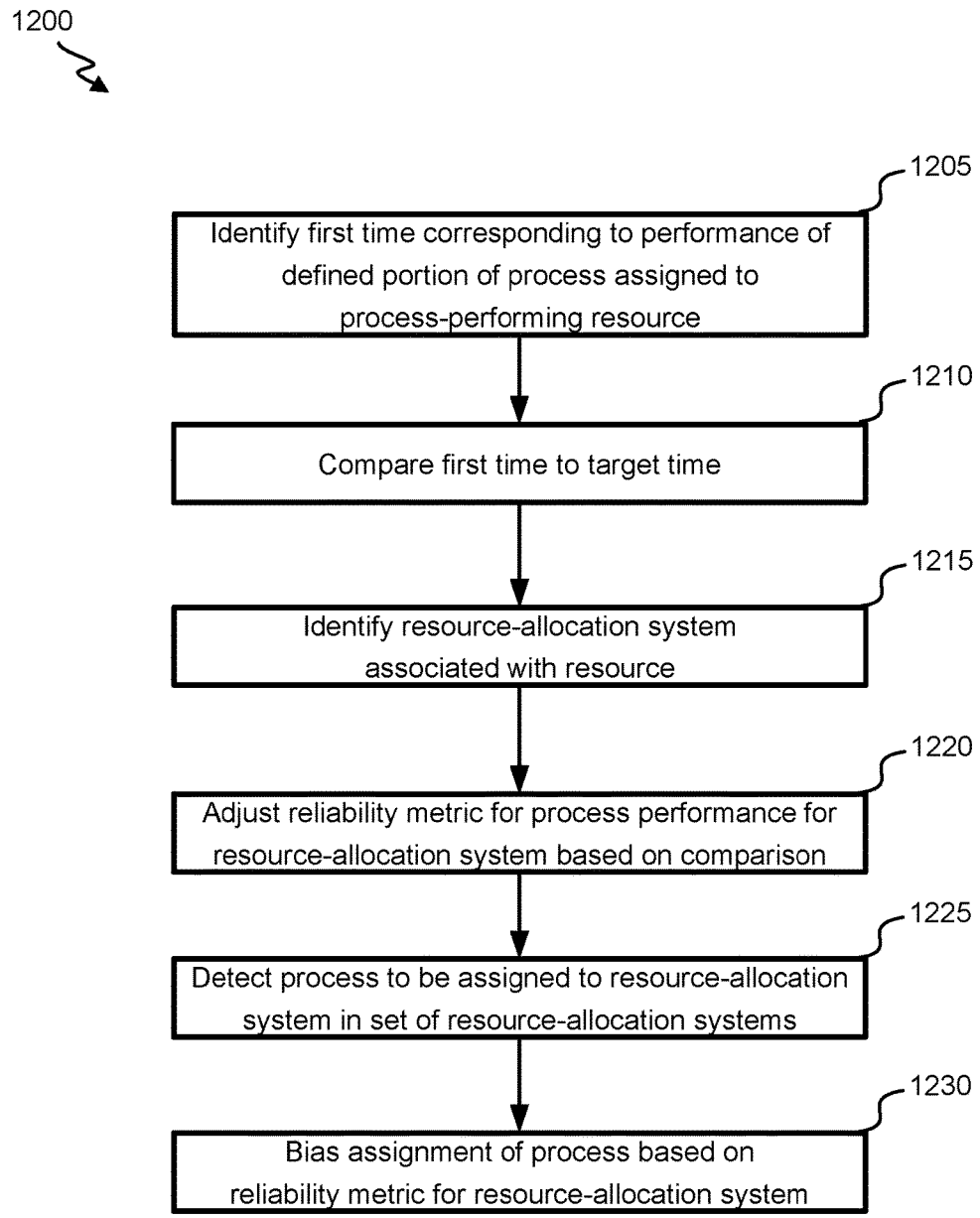
FIG. 12 illustrates a flowchart of a process for distributions of process assignments, in accordance with certain embodiments of the present disclosure.

FIG. 12 illustrates a flowchart of a process 1200 for using location data of resources for control of distributions of process assignments, in accordance with certain embodiments of the present disclosure. The process 1200 can be performed in part or in its entirety by the load orchestration system 145 to provide a number of technological improvements disclosed herein. In some embodiments, the process 1200 may begin at block 1205 where a first time may be identified that corresponds to a performance of a defined portion of a process assigned to a resource according to a particularized composite package 1045. The first time can include an actual or estimated time at which the defined portion may be completed. In some instances, block 1205 includes determining whether the defined portion may be completed by a particular time specified by a composite package 1045, and, if not, identifying when the portion may be completed (e.g., so as not to detect early completion). In some instances, early performances are also identified For example, the first time can identify a time at which the resource may be prepared to be made available for a load of the process, may be actually made available for the load, has accepted the load, may be applied to the load, and/or may be otherwise used for the load. In some instances, the first time relates to a time at which the resource may be located at a particular location corresponding to the process. In some embodiments, the first time can be identified based at least in part on location tracking of the resource. In some embodiments, a signal can be received from the resource or an intermediate system (e.g., an associated resource-allocation system or a system receiving input indicating that the portion has been completed) that identifies a location of the resource (e.g., geographic coordinates and/or whether it may be at a particular location). When the location matches a location corresponding to the portion of the process specified by the particularized composite package 1045, a first time can be defined as a time at which the signal was received and/or a time included in the signal.

At block 1210, the first time may be compared to a target time specified by the particular composite package 1045. The target time can include a particular time point (e.g., date and time of day) or a time window (e.g., date and range of times or a time threshold). The target time can include one associated with the process and/or the portion of the process. For example, the target time can include a time by which or during which the resource at which the resource may be to be prepared to be made available for the load, may be to be actually made available for the load, may be to accept the load, may be to be applied to the load, may be otherwise to be used for the load, and/or may be to be located at a particular location (e.g., as specified in the process).

In some instances, a target time for completing the defined portion of the process may be identified by the particular composite package 1045. The target time can include a time at which the defined portion was scheduled to be completed by the load orchestration system 145, for example, based at least in part on data corresponding to a particular process, resource, and/or resource-allocation system. For example, an identifier of the process can be looked up in the particularized composite package 1045 so as to identify one or more target times for the process.

The operation specifications 1045(c) and/or the timetable 1045(e) may specify the target time for completing the defined portion of the process. The comparison of the first time to the target time can include, for example, determining whether the first time preceded the target time and/or an extent to which the first time differed from the target time (e.g., a delay in completion of the defined portion). In some instances, the comparison can account for potentially intervening factors, such as traffic conditions near a location corresponding to the defined portion of the process.

At block 1215, a resource-allocation system 135 associated with the resource may be identified. The resource-allocation system 135 can include one to which the process was assigned by the load orchestration system 145. The resource-allocation system 135 can control and/or coordinate a schedule for each of one or more resources. For example, the resource-allocation system can receive process assignments from each of one or more schedulers and can assign corresponding processes to appropriate resources. As one particular illustration, the resource-allocation system 135 can coordinate a schedule of one or more resources.

The resource-allocation system 135 can be identified within a received signal (e.g., identifying the first time) and/or can be determined using other information (e.g., an identifier of the process and/or an identifier of the resource). For example, a signal can identify a particular resource and a first time at which the resource arrived at a first location as specified in a process. The load orchestration system 145 can then look up an identifier of the resource in the performance data store 134 or another data structure that associates particular resources with particular resource-allocation systems 135. As another example, a signal can identify that a particular resource arrived at a first load-acquisition time for a particular load. The load orchestration system 145 can then look up an identifier of the load in a particularized composite package 1045, the composite data stores 1038, and/or another data structure that associates load identifiers with process identifiers and identifiers of resource-allocation systems assigned to handle the processes.

At block 1220, a reliability metric for process performance for the resource-allocation system 135 may be adjusted based at least in part on the comparison. The reliability metric can reflect or relate to, for example, a probability that particular portions of processes assigned to the resource-allocation system 135 are completed prior to a target time and/or a statistic reflecting delays in completing the defined portion. For example, for processes that indicate that loads are to be picked up at particular locations in a resource and transitioned to destination locations, the metric can include a percentage of time that the transport mechanism was at an acquisition point prior to or at a target acquisition time or an average or median difference between a target acquisition time and actual acquisition times. Metrics can generally apply to resource-allocation system 135 or can be specific based at least in part on factors such as resource types, particular resources, particular resource controllers, particular load-acquisition locations, types of process portions, etc. Adjusting the metric can include, for example, updating a probability or statistic. In some instances, the updating can occur in a manner that reduces relative influence on older medical-related data. Additionally or alternatively, other performance metrics (e.g., efficiency metrics) may be utilized with the method operations disclosed herein.

At block 1225, a process to be assigned to a resource-allocation system 135 may be detected (e.g., a process request corresponding to the data 1029 may be received, or the composite builder 1035(*a*) may determine the process to be a subprocess necessary to fulfill an explicit, more general process request corresponding to the data 1029 received). The process can include one that requires a resource, such as a resource to facilitate transitioning a load (e.g., load or piece of equipment) from a first location to a destination location, or another resource to be used for the load. In some instances, data can indicate that process-assignment relationships have been established between the load orchestration system 145 and each of a set of resource-allocation systems 135. The set of resource-allocation systems 135 can include the resource-allocation system 135 for which the reliability metric was adjusted at block 1220.

At block 1230, an assignment of the process can be biased based at least in part on the reliability metric that was adjusted at block 1220. Effecting assignment biases can include, for example, transmitting signals identifying a potential process assignment to an incomplete subset of the set of resource-allocation systems 135 (e.g., those with favorable metrics satisfying one or more thresholds), transmitting a signal identifying a potential process assignment to one resource-allocation system 135 (e.g., with a favorable metric satisfying a particular threshold) before a similar signal may be transmitted to another system 135, identifying fewer constraints for a process in a signal transmitted to one resource-allocation system 135 as compared to a corresponding process as identified to another system 135 and/or biasing actual process assignments towards systems 135 with favorable metrics (e.g., when multiple resource-allocation systems 135 transmit signals corresponding to confirmation of the assignment of the process). The bias can occur by implementing a ranking, order, and/or weighting. The bias can occur to favor, for example, resource-allocation systems 135 associated with reliability metrics indicating that processes previously assigned to the systems 135 (or defined portions thereof) where consistently and/or timely performed.

Figure 13:
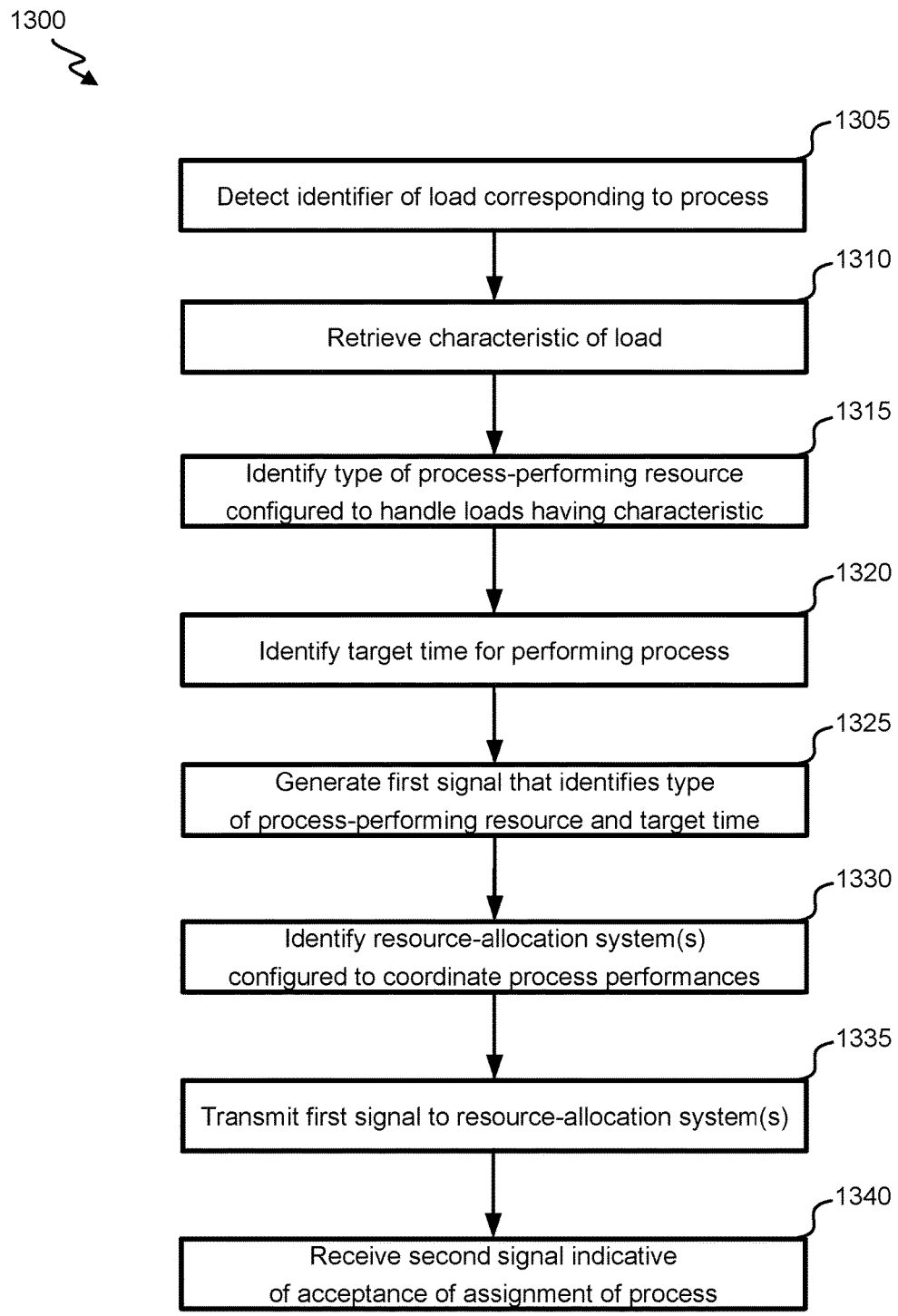
FIG. 13 illustrates a flowchart of a process for collecting process specifications and identifying appropriate process-performing resources, in accordance with certain embodiments of the present disclosure.

FIG. 13 illustrates a flowchart of a process 1300 for collecting process specifications and identifying appropriate process-performing resources, in accordance with certain embodiments of the present disclosure. The load orchestration system 145 provides a number of technological improvements disclosed herein with the process 1300. The process 1300 may begin at block 1305 where an identifier of a load of a process may be detected. The detection can include, for example, detecting a scan of an electronic device or electronic tag corresponding to the load, or detecting input that identifies the load. In some instances, the load can be one that may be to be transitioned from a first location to a second location by a resource. In some instances, the load can be one which may be not transitioned from a certain time period, but may require application of certain resources. The load can include a piece of equipment, medication, lab samples, or a load.

The identifier can be used to access an electronic record corresponding to the load. At block 1310, a characteristic of the load can be retrieved from the record. The characteristic can include a physical characteristic (e.g., a weight or dimension) or a handling requirement (e.g., appropriate temperature and/or required nearby medical equipment or personnel). In one instance, the characteristic identifies a degree to which a load may be medically stable (or instable) and/or requiring intense care during transition and/or otherwise.

At block 1315, a type of process-performing resource configured to handle, accept, apply to, provide a service to, and/or otherwise be used for loads having the characteristic may be identified. For example, block 1315 can include identifying a threshold speed, size, or dimension of a resource. As another example, block 1315 can include identifying a functionality, capability, or component of a resource (e.g., that it must include a transcutaneous cardiac pacemaker or a particular medication or that a paramedic be physically available in or near the resource to control process performance).

At block 1320, a target time for performing at least part of the process may be identified. For example, the target time can include a time at which it may be desired that the assigned process may be initiated, that a resource may be available to begin performing the assigned process, that a resource may be located at a particular location (e.g., a load-acquisition or destination) corresponding to the process, that the resource has begun handling the load, that the resource may be at a destination location, that a defined portion of the process has been completed, that the process has been entirely completed, and/or the like. In some instances, a target time may be explicitly identified by a process request corresponding to the data 1029 received. In some instances, the target time can be identified by the composite builder 1035(*a*), for example, based at least in part on scheduling objectives of an institution, process parameters, the characteristic, and/or the like. The target time can include an absolute time (e.g., November 23 at 12 am) or a time range (e.g., November 23, 12-9:15 am).

At block 1325, a first signal may be generated that identifies the type of process-performing resource and the target time. The first signal can correspond to an indication that a process corresponding to data in the first signal may be requiring assignment or will be assigned. The first signal can correspond to an indication that the load orchestration system 145 may be accepting indications from resource-allocation systems 135 that such resource allocations are available and/or equipped to handle the process. In some instances, the first signal includes additional information about the process, such as one or more geographical locations involved in the process (e.g., an acquisition and/or destination location), an identification of an associated scheduler or institution and/or a deadline for responding to the first signal.

At block 1330, one or more resource-allocation systems 135 to receive the first signal may be identified. In some instances, each of a set of resource-allocation systems 135 may be configured to control, schedule, and/or coordinate use of one or more resources. An institution corresponding to the load orchestration system 145 can have an established working relationship with an entity associated with each of the set of resource-allocation systems 135 that supports a coordinated approach for scheduling resources to meet priorities of the load orchestration system 145. In some instances, the load orchestration system 145 maintains and/or has access to a data store (e.g., performance data store 134 and/or resource timetable 138) that indicates, for each of the set of resource-allocation systems 135, identifying information (e.g., a name of a corresponding entity), communication-protocol information (e.g., a mode of communication or contact identifier), an identification of each type of resource coordinated by the resource-allocation system 135, a quantity of available resources (e.g., generally or of a given type), a resource constraint (e.g., geographic limits as to where a resource can be used), and/or a performance metric.

In some instances, the one or more resource-allocation systems 135 may include all of the resource-allocation systems 135 in the set. In some instances, an incomplete subset may be selected. For example, the incomplete subset can include systems 135 associated with performance metrics above an absolute or relative threshold (e.g., within the top five in a set) and/or with at least a threshold number (e.g., 1 or within the top three amongst the set) of resources of a type matching that identified at block 1315.

At block 1335, the first signal may be transmitted to the identified resource-allocation systems 135. The first signal can be transmitted, for example, wirelessly and over a network (e.g., the Internet or a phone network). In some instances, blocks 1330 and 1335 can be repeatedly performed. For example, the first signal can be initially sent to a first resource-allocation system 135. If the first resource-allocation system 135 does not respond to the first signal within a prescribed time period and/or declines the process, the a second resource-allocation system 135 can be identified.

At block 1340, a second signal may be received from a resource-allocation system 135 that may be indicative of an availability to accept assignment of the process. The second signal can indicate that a resource associated with the resource-allocation system 135 may be available, can identify an identifier or specification of the available resource, and/or can identify one or more times (e.g., start times, end times and/or time periods) that the resource may be available. In some instances, the second signal may include a response that, at least in part, does not match the process.

Thus, the process 1300 can involve automatically identifying resource specifications appropriate for a particular process. Such specifications can be used to communicate the process to select resource-allocation systems 135 likely to include resources with the identified specifications and/or to identify to resource-allocation systems 135 as to what types of resources would be required for process performance. Efficiency of scheduling processes and performance of processes can thereby be improved.

Figure 14:
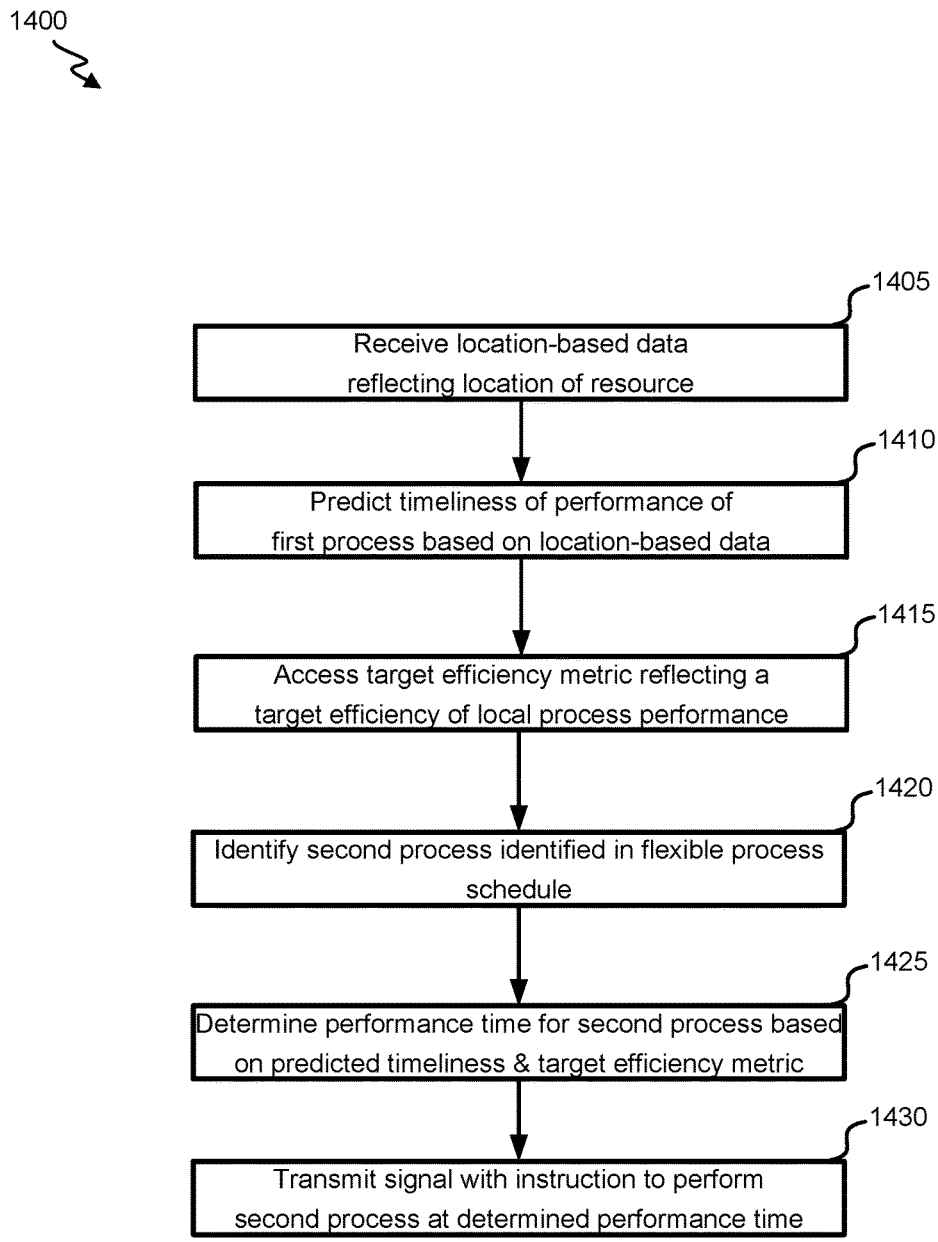
FIG. 14 illustrates a flowchart of a process for electronically adjusting scheduled processes, in accordance with certain embodiments of the present disclosure.

FIG. 14 illustrates a flowchart of a process 1400 for using location data of resources for electronically adjusting scheduled processes, in accordance with certain embodiments of the present disclosure. The load orchestration system 145 provides a number of technological improvements disclosed herein with the process 1400. The process 1400 may begin at block 1405 where location-based data reflecting a location of a resource may be received by the load orchestration system 145. Some embodiments may provide for capturing and analyzing location-based data for a resource (e.g., location-based data provided by way of GPS, Wi-Fi, cellular, and/or other techniques for determining a current location of the resource). The location-based data can be received from a resource-allocation system 135. The resource-allocation system 135 can include a distributed system that includes a location-tracking component in the resource, or it can otherwise be in communication with a location-tracking system in the resource.

The location-based data can identify, for example, a location of the resource (e.g., a nearby reference location's or geographic coordinates) or a distance that the resource may be from a location (e.g., from an acquisition location corresponding to a process). In some instances, the location-based data includes a time, such as an estimated arrival time (e.g., 23 minutes or at 3:10), that may be based at least in part on a location of the resource. Location-based data can be based at least in part on signals (e.g., from GPS satellites or other sources) received by a receiver in a component of or device in the resource. The location-based data may be a combination of data based at least in part on one or a combination of GPS, Wi-Fi, cellular, equipment sensor(s) such as a barometric sensor or accelerometer, RFID device signals, and/or other techniques for determining a current location of the resource.

The resource may access one or more networks through a wireless link to one or more access points, which may be of any suitable type or types and may connect the resource to the one or more networks, which may include the Internet, an intranet, a local area network, a public switched telephone network (PSTN), private communication networks, etc. For example, an access point may be a cellular base station, an access point for wireless local area network (e.g., a Wi-Fi access point), an access point for wireless personal area network (e.g., a Bluetooth access point), etc. In some embodiments, access point(s) may be used in obtaining location information for the resource.

At block 1410, a timeliness of performance of a first process may be predicted by the load orchestration system 145 based at least in part on the location-based data. The prediction can include, for example, predicting whether all or a defined portion (e.g., an acquisition or an arrival of a resource) of a process will be completed by a target time and/or predicting an extent to which completion of a defined portion or all of the process will be delayed beyond a target time. In some instances, the prediction can include predicting whether a defined portion (or all) of the process will be performed by a target time plus a defined buffer time.

At block 1415, a target efficiency metric that reflects a target efficiency of local process performance may be accessed by the load orchestration system 145. The target efficiency metric can relate to, for example, a number of local processes (e.g., discharges) to be performed during a defined time period, spacing of processes (e.g., discharges) across a defined time period or delays between related processes (e.g., preparing a load for discharge and discharging the load). For example, a target efficiency metric can indicate that, amongst a set of loads to be discharged during a day, it may be desired that 50% of those loads be discharged before 1 pm. The target efficiency metric can be identified based at least in part on stored data, input (e.g., received from an institution agent), and/or a learning technique that identifies metrics associated with positive results (e.g., positive health outcomes, such as low mortality and low readmission; high efficiency, such as attending to a large number of loads per day; low waiting times; etc.).

At block 1420, a second process may be identified by the load orchestration system 145. In some instances, the second process can include one that may be flexibly scheduled, in that a time at which part or all of the process may be to be performed can be adjusted. Whether a process may be flexibly scheduled can depend on, for example, whether performance of the process has begun or a priority of the process (e.g., where processes involving urgent health matters may be identified as inflexible). One or more processes may be identified as part of a transition and resource-allocation program for a particular load. Hence, the one or more processes may be specified as required for one or more different transfers of the load and/or one or more other services provided to the load.

In some instances, the second process can include one that may be related to the first process. For example, the first process can include transitioning a first load from a load-acquisition location to a destination, and a second process can include discharging the first load from the load-acquisition location, a service pertinent to preparing the first load for transfer, a service to be provided to the load at the destination, or otherwise providing a service that follows from the first process. Thus, if the first process may be delayed, it may be desirable to reschedule the related second process so as to avoid or reduce a waiting period between the processes.

In some instances, the second process can include on that may be or may be related to a process that may be of a similar type as the first process. For example, the first process can include transitioning a first load from a load-acquisition location to a destination, and a second process can include discharging a second load from the load-acquisition location. Thus, if the first process may be delayed, rescheduling the second process can aid an institution in nonetheless reaching a target metric (e.g., number of discharges per time period).

At block 1425, a performance time (e.g., a target time) for the second process may be determined by the load orchestration system 145 based at least in part on the predicted timeliness and/or target efficiency metric. For example, at block 1410, it can be predicted that the first process will be completed 30 minutes late. A performance time of a related second process can then be adjusted to be 30 minutes later than initially scheduled. As another example, at block 1410, it can be predicted that a portion of the first process that was initially scheduled to be completed during a first time period will be completed in a second period. The performance time for a portion of the second process can then be set to be (or to be within) the first time period.

At block 1430, a signal may be transmitted by the load orchestration system 145 with an instruction to perform the second process (or portion thereof) at the determined performance time. The signal can be transmitted to, for example, a resource, a device of a care provider, a resource-allocation system 135, or other device or system that facilitates performance of a process. In some instances, the signal can include an option to confirm, accept, and/or reject the instruction. Thus, by monitoring location-based data of resources, a schedule involving multiple processes, resources and/or entities can be dynamically reconfigured to promote achievement of target metrics even when faced with delays.

Figure 15:
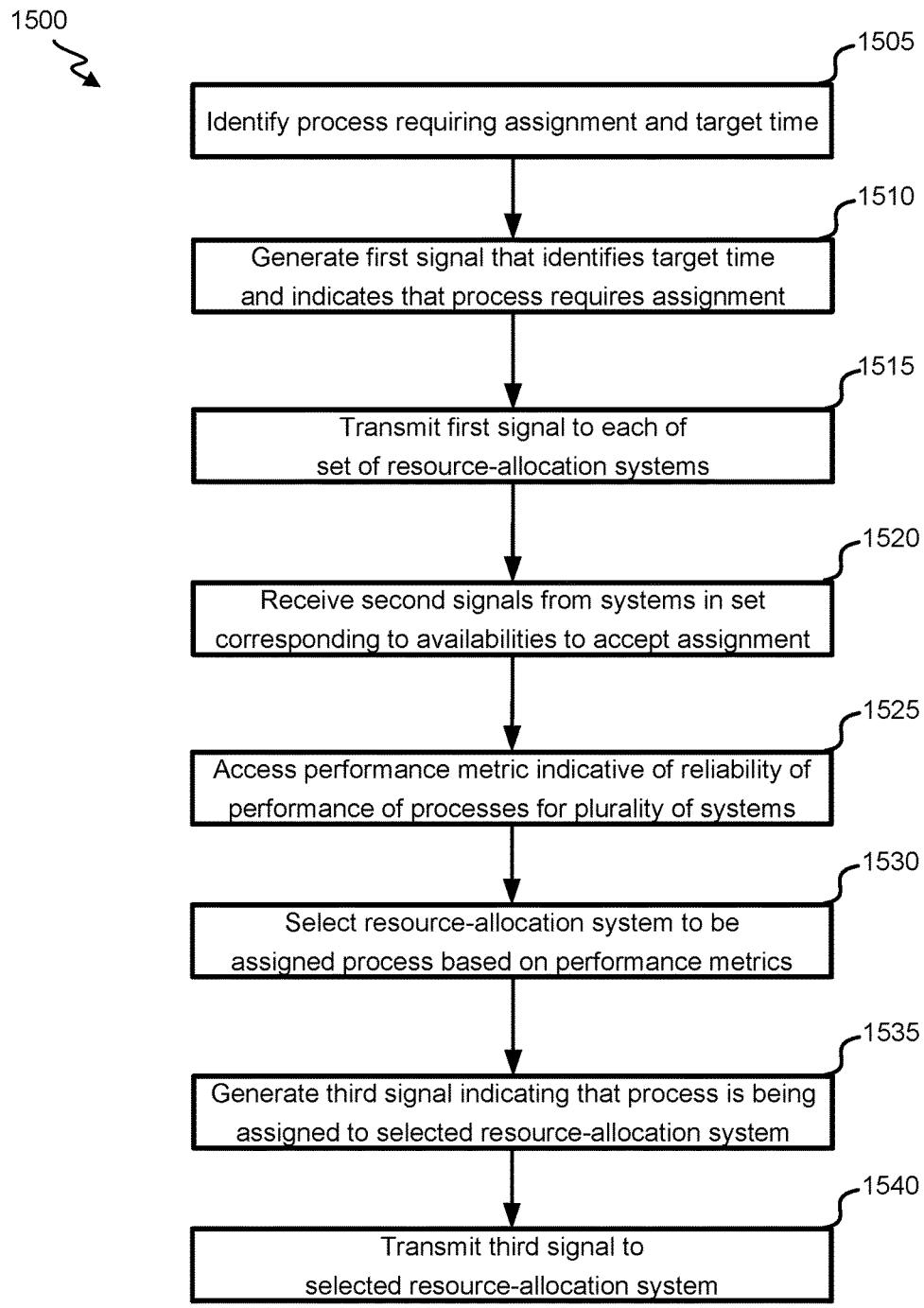
FIG. 15 illustrates a flowchart of a process for assigning processes based at least in part on empirical performance assessments of resource-allocation systems, in accordance with certain embodiments of the present disclosure.

FIG. 15 illustrates a flowchart of a process 1500 for assigning processes based at least in part on empirical performance assessments of resource-allocation systems, in accordance with certain embodiments of the present disclosure. The load orchestration system 145 provides a number of technological improvements disclosed herein with the process 1500. The process 1500 may begin at block 1505 where a process requiring assignment to a resource-allocation system 135 may be identified by the load orchestration system 145. Assignment of the process can result in the assigned resource-allocation system 135 configuring a resource associated with the resource-allocation system 135 to perform the process. The process can include, for example, transitioning a load between locations, transitioning a resource to a load, otherwise making available a resource to a load, applying resource to a load, and/or the like.

A target time for the process may be identified by the load orchestration system 145 at block 1505. The target time can be based at least in part on a target metric, a characteristic of a load involved in the process (e.g., medical stability of a load), a queue of other processes requiring a resource (e.g., also required by the process or that will be freed upon performance of the process), etc. In some instances, the target time may be identified via user input and conveyed via an interface of the load orchestration system 145. The target time can include a time at which a defined portion or all of the process may be to be completed. Thus, in some instances, multiple target times can be identified for a given process.

At block 1510, a first signal corresponding to the process may be generated by the load orchestration system 145 that identifies the target time and may be indicative that the process may be requiring assignment. At block 1515, the first signal may be transmitted by the load orchestration system 145 to each resource-allocation system 135 of a set of resource-allocation systems 135. In some instances, each of the set of resource-allocation systems 135 bold that may be configured to control, schedule, and/or coordinate use of one or more resources. An institution corresponding to the load orchestration system 145 can have an established working relationship with an entity associated with each of the set of resource-allocation systems 135 that supports a coordinated approach for scheduling resources to meet priorities of the scheduler.

In some instances, the load orchestration system 145 may maintain and/or have access to a medical-related data store (e.g., 134 and/or 138) that indicates, for each of a group of resource-allocation systems 135, identifying information (e.g., a name of a corresponding entity), communication-protocol information (e.g., a mode of communication or contact identifier), an identification of each type of resource coordinated by the resource-allocation system 135, a quantity of available resources (e.g., generally or of a given type), a resource constraint (e.g., geographic limits as to where a resource can be used or time limits as to when a resource can be used) and/or a performance metric. The set of resource-allocation systems 135 can include all of the group of resource-allocation systems 135 or a subset thereof. The subset can be identified based at least in part on, for example, types of resources associated with the systems 135 (e.g., to selectively include systems 135 associated with types of resources appropriate for the processes), performance metrics (e.g., to selectively include systems associated with above-threshold metrics), and/or constraints.

At block 1520, second signals can be received by the load orchestration system 145 from each of a plurality of resource-allocation systems 135 in the set of resource-allocation systems 135. Each second signal can correspond to an availability to accept an assignment of the process. Each second signal can indicate that a resource associated with the resource-allocation system 135 may be available, can include an identifier or specification of the available resource, and/or can identify one or more times (e.g., start times, end times and/or time periods) that the resource may be available.

At block 1525, a performance metric may be accessed by the load orchestration system 145 for each resource-allocation system 135 of the plurality of resource-allocation systems 135. The performance metric can be indicative of a reliability of performance of processes previously assigned to the resource-allocation system 135. The performance metric can reflect and/or be based at least in part on a percentage of processes previously assigned to the system that were completed (or with a defined portion being completed) by a target time and/or a difference between performance times and target times. For example, a performance metric can include an index reflecting a weighted average (e.g., highly weighting recent medical-related data) of a delay between a target acquisition time and an actual acquisition time. In some instances, a set of performance metrics can be associated with a single resource-allocation system 135. The performance metrics can be analyzed collectively or one or more select performance metrics (e.g., applying to the identified process) can be accessed.

At block 1530, a resource-allocation system 135 may be selected by the load orchestration system 145 from amongst the plurality of resource-allocation systems 135 to be assigned the process. The selection can be based at least in part on the accessed performance metrics. For example, the selection can be biased towards systems associated with high metrics. To illustrate, a resource-allocation system 135 associated with a highest performance metric amongst those accessed can be selected or a first resource-allocation system 135 to have responded to the first signal and to be associated with a performance metric above a threshold can be selected.

At block 1535, a third signal may be generated by the load orchestration system 145 that indicates that the process is being assigned to the selected resource-allocation system 135. In some instances, the third signal includes additional information about the process that was not present in the first signal. For example, the third signal can include a name of a load and/or a more particular location. The third signal can further include an identifier for the process and/or instructions to report statuses of the process performance.

At block 1540, the third signal may be transmitted by the load orchestration system 145 to the selected resource-allocation system 135. Thus, process 1500 illustrates a technique for using performance metrics to adjust assignments of processes. Resource-allocation systems 135 associated with performance metrics indicative of consistent high-quality performance can be preferentially notified of potential process assignments and/or assigned processes.

It will also be appreciated that presentations disclosed and/or illustrated herein can be configured to provide various types of interaction capabilities and/or presentation types. For example, presentations can identify whether and/or an extent to which a variable exceeds or misses a target threshold and/or how the variable may be changing over time. Presentations can be presented in a manner such that entities associated with particular data are identified, anonymized and/or conditionally identified (e.g., depending on a reviewer). Presentations can be dynamic such that new data may be routinely reflected in the presentation and/or interactive such that a variable selection, constraint identification, degree of summarization and entity representation can be modified in response to particular user input.

Specific details are given in the above description to provide a thorough understanding of the embodiments. However, it may be understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it may be noted that the embodiments can be described as a process which may be depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process may be terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary processes can be stored in a machine readable medium such as a storage medium.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and may be not to be limited to any particular type of memory or number of memories, or type of media upon which memory may be stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but may be not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it may be to be clearly understood that this description may be made only by way of example and not as limitation on the scope of the disclosure.

What is claimed:

1. A system to orchestrate process-performing resources and process specifications particularized to individual loads, the system comprising:

one or more interfaces that:
receive a first set of electronic communications from one or more client devices, the first set of electronic communications comprising a digital identifier of an individual load;
receive a second set of electronic communications from one or more location data sources, the second set of electronic communications comprising location data indicative of a first location of the individual load;
transmit a third set of electronic communications to one or more resource-controlling devices, the third set of electronic communications comprising an instruction to perform a process;
transmit a fourth set of electronic communications to the one or more client devices, the fourth set of electronic communications comprising specifications of electronic composites;
an aggregator to retrieve, from one or more electronic records and based at least in part on the digital identifier of the individual load, a first set of secured information associated with the individual load, wherein the first set of secured information associated with the individual load comprises one or more attributes corresponding to one or more of:
an indication of a set of one or more conditions of the individual load;
an indication of a set of one or more services associated with the individual load; and/or
an indication of one or more auxiliary resources associated with the individual load; and
one or more processors that:
create a provisional electronic composite for the individual load at least in part by:
identifying the process based at least in part on the first set of electronic communications;
identifying one or more process-performance locations based at least in part on the first set of electronic communications;
identifying one or more process-performance times based at least in part on the first set of electronic communications;
identifying a process type of the process;
based at least in part on the process type, identifying a type of process-performing resource to serve loads having one or more characteristics corresponding to the one or more attributes;
accessing performance data, from a performance data store, to identify, based at least in part on the performance data, a process-performance duration that corresponds to one or more of the process type, the type of process-performing resource, the one or more process-performance locations, and/or one or more process-performance times; and
defining a process-assignment duration based at least in part on the process-performance duration;
detect an availability of a process-performing resource of the type of process-performing resource that is of a duration that is at least as long as the process-assignment duration;
determine a performance time for the process to be performed based at least in part on the availability of the process-performing resource;
cause transmission, to at least one resource-controlling device of the one or more resource-controlling devices, of the instruction to perform the process at the performance time and, consequent to the transmission, the at least one resource-controlling device of the one or more resource-controlling devices performs the process at the performance time;
modify the provisional electronic composite for the individual load based at least in part on the performance time and the instruction to the at least one resource-controlling device, the modifying forming an updated electronic composite; and
cause transmission, to at least one of the one or more client devices, of content indicating at least a portion of the updated electronic composite.

2. The system to orchestrate process-performing resources and process specifications particularized to individual loads of claim 1, wherein the first set of electronic communications further comprises an electronic request to perform the process with respect to the individual load and/or a specification of the type of process-performing resource.

3. The system to orchestrate process-performing resources and process specifications particularized to individual loads of claim 1, wherein:
the first set of electronic communications further comprises one or more of an indication of a location, an indication of a procedure, and/or an indication of a condition; and
the one or more processors predicts a request to perform the process with respect to the individual load based at least in part on the first set of electronic communications, and, consequent to the predicting, perform the creating the provisional electronic composite, the forming the updated electronic composite, and the causing transmission of the content.

4. The system to orchestrate process-performing resources and process specifications particularized to individual loads of claim 3, wherein the identifying the process and the identifying the one or more process-performance locations are further based at least in part on a first location of the individual load and a second location based at least in part on the request inferred.

5. The system to orchestrate process-performing resources and process specifications particularized to individual loads of claim 4, wherein the one or more processors:
process a temporal input received via at least one of the one or more interfaces, the temporal input indicative of one or more times and/or one or more time windows;
access a timetable data store to evaluate resource timetables that indicate capacities to accept processes during particular time periods; and
select the process-performing resource from a set of process-performing resources at least in part by matching the temporal input to at least one of the capacities.

6. The system to orchestrate process-performing resources and process specifications particularized to individual loads of claim 1, wherein the one or more processors:
process location-based data, received from one or more location data sources, that indicates a current location of the process-performing resource;
predict a timeliness of performance of the process based at least in part on the location-based data;
access a target efficiency metric reflecting a target efficiency of process performance;
identify a second process identified in a flexible process schedule;
determine a second performance time for the second process to be performed based at least in part on the timeliness of performance of the process predicted and the target efficiency metric; and cause transmission of a second instruction to perform the second process at the second performance time.

7. The system to orchestrate process-performing resources and process specifications particularized to individual loads of claim 6, wherein the location-based data is derived at least partially from one or more of an electronic tag sensor, at least one of the one or more client devices, a resource-allocation system, and/or a monitoring device.

8. The system to orchestrate process-performing resources and process specifications particularized to individual loads of claim 7, wherein the one or more processors:
  modify the updated electronic composite for the individual load based at least in part on the second process and the second performance time; and
  cause transmission, to the at least one of the one or more client devices, of second content indicating at least the second process and the second performance time.

9. A method to orchestrate process-performing resources and process specifications particularized to individual loads, the method comprising:
  receiving a first set of electronic communications from one or more client devices, the first set of electronic communications comprising a digital identifier of an individual load;
  receiving a second set of electronic communications from one or more location data sources, the second set of electronic communications comprising location data indicative of a first location of the individual load;
  transmitting a third set of electronic communications to one or more resource-controlling devices, the third set of electronic communications comprising an instruction to perform a process;
  transmitting a fourth set of electronic communications to the one or more client devices, the fourth set of electronic communications comprising specifications of electronic composites;
  retrieving, from one or more electronic records and based at least in part on the digital identifier of the individual load, a first set of confidential information associated with the individual load, wherein the first set of confidential information associated with the individual load comprises one or more attributes corresponding to one or more of:
    an indication of a set of one or more conditions of the individual load;
    an indication of a set of one or more services associated with the individual load; and/or
    an indication of service equipment associated with the individual load; and
  creating a provisional electronic composite for the individual load at least in part by:
    identifying the process based at least in part on the first set of electronic communications;
    identifying one or more process-performance locations based at least in part on the first set of electronic communications;
    identifying one or more process-performance times based at least in part on the first set of electronic communications;
    identifying a process type of the process;
    based at least in part on the process type, identifying a type of process-performing resource to service loads having one or more characteristics corresponding to the one or more attributes;
    accessing performance data, from a performance data store, to identify, based at least in part on the performance data, a process-performance duration that corresponds to one or more of the process type, the type of process-performing resource, the one or more process-performance locations, and/or one or more process-performance times; and
    defining a process-assignment duration based at least in part on the process-performance duration;
  detecting an availability of a process-performing resource of the type of process-performing resource that is of a duration that is at least as long as the process-assignment duration;
  determining a performance time for the process to be performed based at least in part on the availability of the process-performing resource;
  causing transmission, to at least one resource-controlling device of the one or more resource-controlling devices, of the instruction to perform the process at the performance time and, consequent to the transmission, the at least one resource-controlling device of the one or more resource-controlling devices performs the process at the performance time;
  modifying the provisional electronic composite for the individual load based at least in part on the performance time and the instruction to the at least one resource-controlling device, the modifying forming an updated electronic composite; and
  causing transmission, to at least one of the one or more client devices, of content indicating at least a portion of the updated electronic composite.

10. The method to orchestrate process-performing resources and process specifications particularized to individual loads of claim 9, wherein the first set of electronic communications further comprises an electronic request to perform the process with respect to the individual load and/or a specification of the type of process-performing resource.

11. The method to orchestrate process-performing resources and process specifications particularized to individual loads of claim 9, wherein the first set of electronic communications further comprises one or more of an indication of a location, an indication of a procedure, and/or an indication of a condition; and the method further comprises:
  inferring a request to perform the process with respect to the individual load based at least in part on the first set of electronic communications; and
  performing the creating the provisional electronic composite, the forming the updated electronic composite, and the causing transmission of the content prior to receiving an explicit request to perform the process with respect to the individual load.

12. The method to orchestrate process-performing resources and process specifications particularized to individual loads of claim 11, wherein the identifying the process and the identifying the one or more process-performance locations are further based at least in part on a first location of the individual load and a second location based at least in part on the request inferred.

13. The method to orchestrate process-performing resources and process specifications particularized to individual loads of claim 12, further comprising:
  processing a temporal input received via at least one of the one or more interfaces, the temporal input indicative of one or more times and/or one or more time windows;
  accessing a timetable data store to evaluate resource timetables that indicate capacities to accept processes during particular time periods; and selecting the process-performing resource from a set of process-performing resources at least in part by matching the temporal input to at least one of the capacities.

14. The method to orchestrate process-performing resources and process specifications particularized to individual loads of claim 9, further comprising:
processing location-based data, received from one or more location data sources, that indicates a current location of the process-performing resource;
predicting a timeliness of performance of the process based at least in part on the location-based data;
accessing a target efficiency metric reflecting a target efficiency of process performance;
identifying a second process identified in a flexible process schedule;
determining a second performance time for the second process to be performed based at least in part on the timeliness of performance of the process predicted and the target efficiency metric; and
causing transmission of a second instruction to perform the second process at the second performance time.

15. The method to orchestrate process-performing resources and process specifications particularized to individual loads of claim 14, wherein the location-based data is derived at least partially from one or more of an electronic tag sensor, at least one of the one or more client devices, a resource-allocation system, and/or a monitoring device.

16. The method to orchestrate process-performing resources and process specifications particularized to individual loads of claim 15, further comprising:
receiving a set of clinical messages comprising a plurality of segments and a plurality of data types;
parsing, in accordance with a common object specification, a first message to identify a set of segments of the plurality of segments and a set of data types of the plurality of data types; and
populating, in accordance with the common object specification, a plurality of fields of a common data object with data corresponding to the set of segments and the set of data types.

17. One or more non-transitory, machine-readable media having machine-readable instructions thereon which, when executed by a system to orchestrate process-performing resources and process specifications particularized to individual loads, implements a method comprising:
receiving a first set of electronic communications from one or more client devices, the first set of electronic communications comprising a digital identifier of an individual load;
receiving a second set of electronic communications from one or more location data sources, the second set of electronic communications comprising location data indicative of a first location of the individual load;
transmitting a third set of electronic communications to one or more resource-controlling devices, the third set of electronic communications comprising an instruction to perform a process;
transmitting a fourth set of electronic communications to the one or more client devices, the fourth set of electronic communications comprising specifications of electronic composites;
retrieving, from one or more electronic records and based at least in part on the digital identifier of the individual load, a first set of confidential information associated with the individual load, wherein the first set of confidential information associated with the individual load comprises one or more attributes corresponding to one or more of:
an indication of a set of one or more conditions of the individual load;
an indication of a set of one or more services associated with the individual load; and/or
an indication of service equipment associated with the individual load; and
creating a provisional electronic composite for the individual load at least in part by:
identifying the process based at least in part on the first set of electronic communications;
identifying one or more process-performance locations based at least in part on the first set of electronic communications;
identifying one or more process-performance times based at least in part on the first set of electronic communications;
identifying a process type of the process;
based at least in part on the process type, identifying a type of process-performing resource to service loads having one or more characteristics corresponding to the one or more attributes;
accessing performance data, from a performance data store, to identify, based at least in part on the performance data, a process-performance duration that corresponds to one or more of the process type, the type of process-performing resource, the one or more process-performance locations, and/or one or more process-performance times; and
defining a process-assignment duration based at least in part on the process-performance duration;
detecting an availability of a process-performing resource of the type of process-performing resource that is of a duration that is at least as long as the process-assignment duration;
determining a performance time for the process to be performed based at least in part on the availability of the process-performing resource;
causing transmission, to at least one resource-controlling device of the one or more resource-controlling devices, of the instruction to perform the process at the performance time and, consequent to the transmission, the at least one resource-controlling device of the one or more resource-controlling devices performs the process at the performance time;
modifying the provisional electronic composite for the individual load based at least in part on the performance time and the instruction to the at least one resource-controlling device, the modifying forming an updated electronic composite; and
causing transmission, to at least one of the one or more client devices, of content indicating at least a portion of the updated electronic composite.

18. The one or more non-transitory, machine-readable media of claim 17, wherein the first set of electronic communications further comprises an electronic request to perform the process with respect to the individual load and/or a specification of the type of process-performing resource.

19. The one or more non-transitory, machine-readable media of claim 17, wherein the first set of electronic communications further comprises one or more of an indication of a location, an indication of a procedure, and/or an indication of a condition; and the method further comprises:

inferring a request to perform the process with respect to the individual load based at least in part on the first set of electronic communications; and performing the creating the provisional electronic composite, the forming the updated electronic composite, and the causing transmission of the content prior to receiving an explicit request to perform the process with respect to the individual load.

20. The one or more non-transitory, machine-readable media of claim 19, wherein the identifying the process and the identifying the one or more process-performance locations are further based at least in part on a first location of the individual load and a second location based at least in part on the request inferred.

* * * * *